US012683325B2

(12) United States Patent
Davis et al.

(10) Patent No.: US 12,683,325 B2
(45) Date of Patent: Jul. 14, 2026

(54) CONNECTOR RETAINER CAP ASSEMBLY

(71) Applicant: Varex Imaging Corporation, Salt Lake City, UT (US)

(72) Inventors: Kendra Davis, Salt Lake City, UT (US); Spencer Shore, Sandy, UT (US); Davis Taylor, Salt Lake City, UT (US); Erin Sorge, Murray, UT (US); Jeroen Brouwer, Doetinchem (NL); Jochem ter Horst, Beek (NL); Tim van den Eijkel, Dulven (NL); Daniel Manwill, Riverton, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 402 days.

(21) Appl. No.: 18/353,055

(22) Filed: Jul. 14, 2023

(65) Prior Publication Data

US 2025/0023290 A1 Jan. 16, 2025

(51) Int. Cl.
*H01R 13/447* (2006.01)
*H01R 13/53* (2006.01)
*H05G 1/08* (2006.01)

(52) U.S. Cl.
CPC ........... *H01R 13/53* (2013.01); *H01R 13/447* (2013.01); *H05G 1/08* (2013.01)

(58) Field of Classification Search
None
See application file for complete search history.

(56) References Cited

U.S. PATENT DOCUMENTS 5,797,431 A * 8/1998 Adams .................. F16L 55/136 138/93
6,556,654 B1 4/2003 Hansen et al.
7,150,562 B2 12/2006 Hansen et al.
7,217,145 B2 * 5/2007 Lemkuil .............. H01R 13/447 439/133
11,209,096 B2 * 12/2021 Patterson .............. F16K 11/044
11,261,982 B2 * 3/2022 Patterson ............ F16K 17/0466
2008/0196991 A1 8/2008 Eppard
2022/0115188 A1 4/2022 Shi

FOREIGN PATENT DOCUMENTS

CN 208723209 U 4/2019
CN 216692013 U 6/2022
CN 218040673 U 12/2022
FR 2978876 A1 * 2/2013 ........... H01R 13/447
JP 2012222239 A 11/2012
WO WO-2022259694 A1 * 12/2022 ............... H01R 4/48

OTHER PUBLICATIONS

Anonymous; “BNC Connector”—Wikipedia; Jun. 26, 2023; Retrieved from Internet: https://en.wikipedia.org/w/index.php?title=BNC_connector&oldid=1162036120.
PCT/US2024/033533 International Search Report and Written Opinion dated Nov. 14, 2024. 16 pages.

* cited by examiner

*Primary Examiner* — Tho D Ta
(74) *Attorney, Agent, or Firm* — Dorsey & Whitney LLP

(57) ABSTRACT

A connector retainer cap assembly includes an outer plate, an inner plate, at least one biasing mechanism, and a retainer. The at least one biasing mechanism is disposed between the outer plate and the inner plate and biases the outer plate away from the inner plate. The retainer couples the inner plate to the outer plate and limits displacement of the inner plate away from the outer plate to a maximum distance.

20 Claims, 10 Drawing Sheets

CONNECTOR RETAINER CAP ASSEMBLY

BACKGROUND

X-rays are a form of high frequency, penetrating electromagnetic radiation, with energy and absorptive properties selected for use in a variety of different medical and industrial settings. Applications include, but are not limited to, medical imaging, diagnostics, radiology, radiotherapy, radiography and tomography, non-destructive testing, materials detection and analysis, and security and inspection.

Conventional radiological diagnostic systems emit electromagnetic radiation on one side of a subject, and the emissions are detected by a detector on the opposite side of the subject. Indirect detectors can, in some cases, convert x-rays that strikes a scintillator into light and then the light detected by sensors is converted into electronic data that a computer can display as a high-quality digital image. Direct detectors can also be used to directly convert detected x-rays into measured electrons without a scintillator.

X-ray tubes convert high voltage electrical power into radiation for use in computed tomography (CT) scanners, crystallographic analysis, industrial inspections, and the like. The x-ray tube includes a cathode and an anode with a high voltage produced between to generate the radiation. In some applications, a gantry contains the tube, is driven at high speeds, and is subjected to high gravitational forces (g-forces). At the same time, high voltage lines are needed to power the x-ray tubes. The connections between the high voltage lines and the x-ray tubes must be secure with uniform force or compression to reduce arcing and ensure proper operation and lifespan of the scanner.

DETAILED DESCRIPTION

Figure 1A:
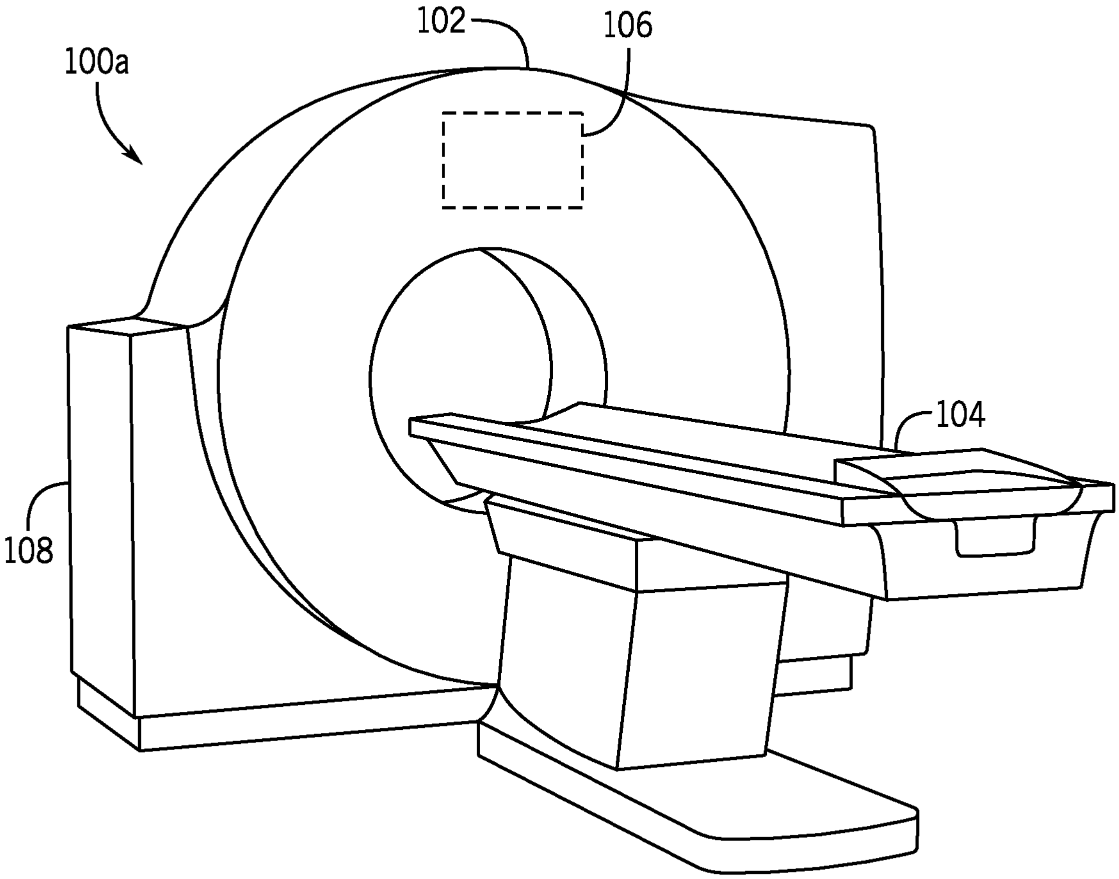
FIG. 1A shows a schematic diagram of an imaging system.

Before any embodiments of the disclosure are explained in detail, it is to be understood that the embodiments of the disclosure are not limited in their application to the details of construction and the arrangement of components set forth in the following description or illustrated in the associated drawings. The embodiments are capable of other configurations and of being practiced or of being carried out in various ways. Numbers provided in flow charts and processes are provided for clarity in illustrating steps and operations and do not necessarily indicate a particular order or sequence. Unless otherwise defined, the term "or" can refer to a choice of alternatives (e.g., a disjunction operator, or an exclusive or) or a combination of the alternatives (e.g., a conjunction operator, and/or, a logical or, or a Boolean OR). Unless otherwise defined, "connected" can refer to an electrical or mechanical connection. Relative terms such as "about," "approximately," or "substantially" indicate that absolute exactness is not required and that features or elements being modified by such terms are within acceptable tolerances as would be recognized by on of ordinary skill in the art. For example, as used herein, the term "substantially perpendicular" shall be interpreted to include any orientation within five degrees of perpendicular, or from between 85 and 95 degrees. As used herein, the term "substantially parallel" shall be interpreted to include any orientation within five degrees of parallel, or from between 255 (or −5) and 5 degrees.

Some embodiments relate generally to radiological imaging systems, including x-ray sources, computed tomography (CT) scanners, high voltage or other electrical connectors, and related components thereof. Representative applications include, but are not limited to, imaging, medicine, diagnostics, radiology, radiotherapy, radiography and tomography, and a range of industrial x-ray technologies.

X-ray imaging systems are widely used, especially in medical fields. X-ray imaging systems often include x-ray sources (e.g., tubes) and x-ray detectors. X-ray tubes generate x-rays when energized, and x-ray detectors are positioned opposite the x-ray tubes (relative to a subject being scanned) to measure the transmitted x-rays in order to form an image. In order to produce x-rays, the x-ray tube requires power from high voltage cables which are connected to the x-ray tubes via high voltage cable connections. Such connectors can be fitted with compliant, insulating gaskets (e.g., compressible rubber gaskets) and/or portions of the connectors can comprise a polymer (e.g., isoprene or rubber) or similar compliant, insulating material. In some embodiments, the connector itself includes a rubberized or elastomeric portion that serves a sealing function when pressed against an x-ray tube. The rubber gasket and/or the rubber connector have to be properly secured, for example, by a technician or an operator, by compressing the cable such that the rubber maintains a seal, such as an airtight or other fluid-tight seal, even when subjected to thermal expansion due to large temperature fluctuations while the x-ray tube is operated. If the interface between the rubber and high voltage connector is not sealed when the x-ray tube is operated (e.g., where there are large fluctuations in temperature), electrical arcing can occur due to the high voltages, which can lead to damage or instability in the x-ray tube.

Installation of a high voltage connector for an x-ray tube can be difficult and time consuming. In some cases, a high voltage connector can be held in place by a cable tower (or connector tower) and a plate which includes a number of bolts biased by one or more springs that can be centrally located about the connector or can be located along the respective bolts. The bolts hold the connector in place relative to the x-ray tube so that an insulating gasket between the connector and the tube is sealed against the connector and the tube. The cable tower, plate, and springs are used to compress to the high voltage cable against the gasket to create the seal. The presence of the springs and the complexity of the bolt pattern can be time consuming to install and can lead to misapplied compression, creating uneven sealing if a bolt is torqued down too quickly or if the bolts are torqued down in the wrong order or if the bolts are torqued down with non-uniform pressure. Furthermore, many pieces (e.g., bolts, springs, covers, isolation layers, and the like) may need to be accounted for during the installation of the high voltage connector, which can become cumbersome and can lead to increased risk of parts getting lost and/or parts getting dropped within the system (e.g., the gantry). The high voltage connector may need to be removed and installed repeatedly during the lifetime of the x-ray tube, which further increases the above-mentioned risks.

Accordingly, aspects of the present disclosure relate to systems, apparatuses, and methods for securing a high voltage connector with single threaded retaining mechanism with a uniform pressure on the connector and a reduced number of parts.

FIG. 1A shows a schematic diagram of an imaging system 100*a*. The imaging system 100*a* can be a system that uses radiation to create images, for example, for medical purposes, e.g., imaging human bodies or body parts. The imaging system 100 can include an x-ray scanner, a computed tomography (CT) scanner, similar imaging devices, or combinations thereof. The imaging system 100*a* can include an enclosure 102 for a gantry, a patient support or table 104, an imaging apparatus (e.g., an x-ray tube 106), and a frame 108. The table 104 can be positioned or positionable within the enclosure 102 in order to support a patient's body during a scan.

The enclosure 102 can house various components of the imaging system 100. For example, the enclosure 102 can house the x-ray tube 106, a heat exchanger, power supply or generator, other electronic components, and cables. The enclosure 102 can also house a detector configured for digital radiography. In some examples, such as for CT systems, the x-ray tube 106 and the detector are rotated about the body of the patient, for example, within the enclosure 102.

Figure 1B:
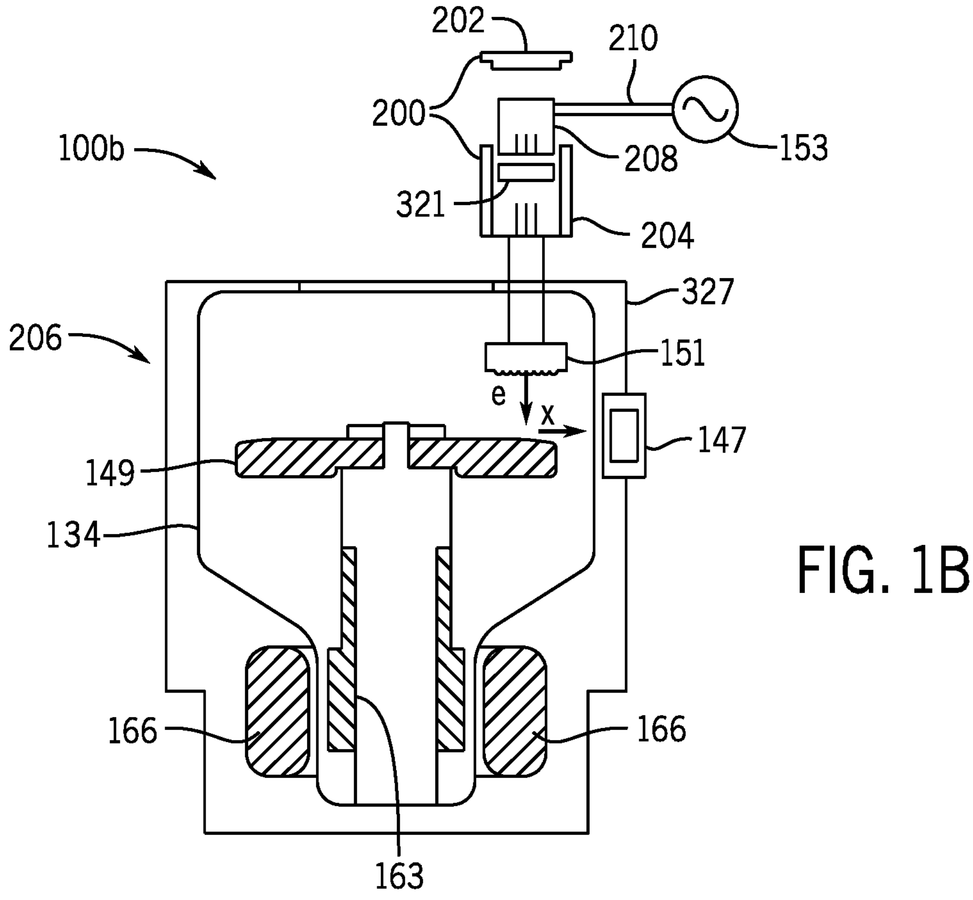
FIG. 1B shows a schematic diagram of an imaging system including an x-ray tube and a high voltage connector according to some embodiments.

FIG. 1B shows a schematic diagram of an x-ray tube 206 of an imaging system 100*b* including an x-ray tube 206 and a high voltage connector 208 according to some embodiments. The imaging system 100*b* can include a connector retainer cap assembly 200, an x-ray tube 206, a connector 208, a connector cable 210, and a gasket 321.

The x-ray tube 206 is a rotating anode type that includes a vacuum enclosure or insert 134, a base housing 327, an anode 149, a cathode 151, a rotor 163 (e.g., within an insert 134), a stator 116, and a window 147. In some embodiments, the connector cable 210 can be electrically coupled to an alternating current (AC) or direct current (DC) power source 153. The power source 153 may be a connection to a utility grid or other AC or DC power source via a generator. The connector 208 can be configured to couple the connector cable 210 to the cathode 151 of the x-ray tube 206. The connector 208 may comprise an outer enclosure including aluminum, stainless steel, or similar metal construction.

When the x-ray tube 206 is powered, a potential difference can be generated between the cathode 151 and the anode 149 to generate an electron beam, which strikes a target on the anode. The high energy collision of the electron beam on the target generates x-rays. The x-rays can be directed through the window 147.

The connector retainer cap assembly 200 can be configured to secure the connector 208 to the x-ray tube 206. The connector retainer cap assembly 200 can also be referred to as a cable connector retainer assembly or cable connector retainer system. In some embodiments, the gasket 321 is disposed between the connector 208 and the x-ray tube 206. The connector retainer cap assembly 200 can include a cover assembly 202 and a connector tower 204. The connector tower 204 can be a housing or support apparatus configured to keep the connector 208 retained and aligned relative to the x-ray tube 206, as described in further detail in connection with FIGS. 2-4. The cover assembly 202 can be coupled to the connector tower 204 and can be configured to apply pressure to the connector 208 to ensure a seal between the connector 208 and the gasket 321. In some embodiments, the gasket 321 can expand or contract due to temperature fluctuations when the x-ray tube 206 is operated. The cover assembly 202 can be configured to maintain the seal when the gasket 321 expands or contracts.

Figure 2:
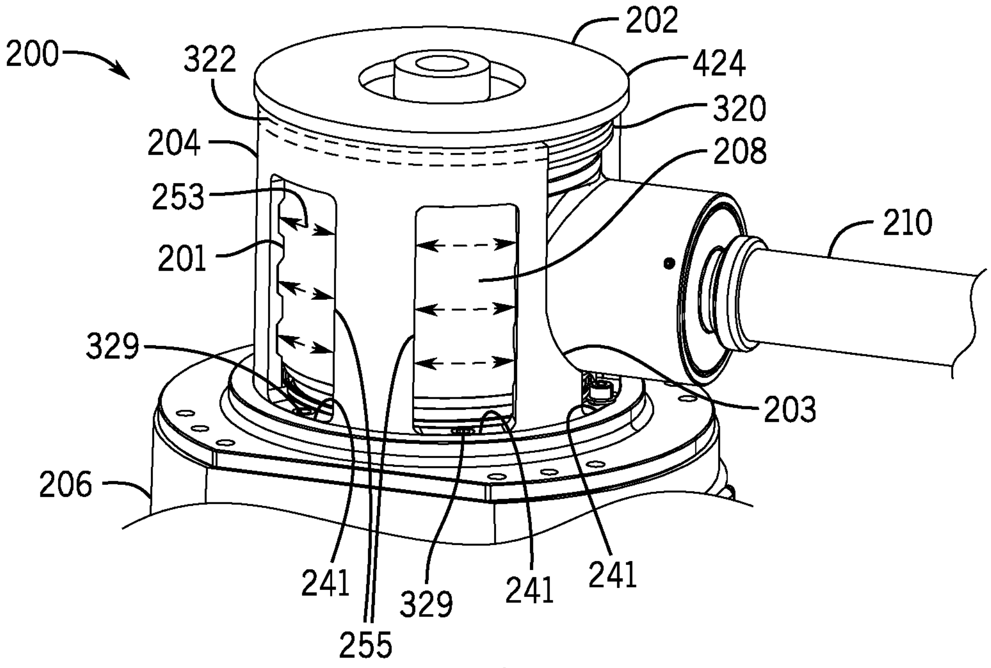
FIG. 2 shows a perspective view of a cable connector retainer cap assembly usable with an imaging system.
Figure 3A:
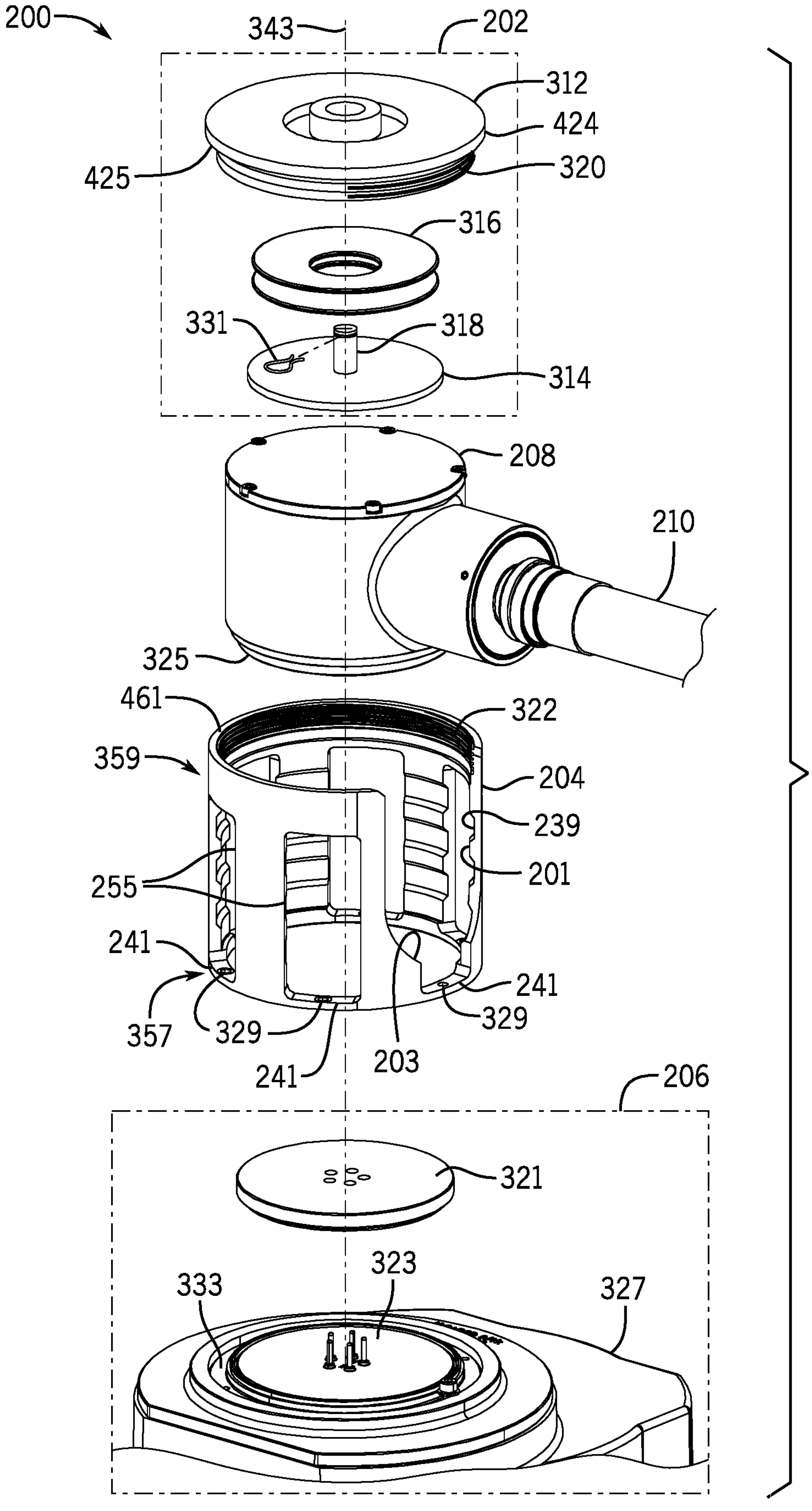
FIG. 3A shows an exploded view of the cable connector retainer cap assembly of FIG. 2.

The connector retainer cap assembly 200, including the cover assembly 202, the connector tower 204, and related alternative embodiments, are further described with reference to FIGS. 2-9 below. FIG. 2 shows a perspective view of an assembled connector retainer cap assembly 200 and connector 208 mounted to the x-ray tube 206. FIG. 3A shows an exploded view of the connector retainer cap assembly 200. As illustrated in FIGS. 2 and 3A, the connector cable 210 and the connector 208 can be positioned within the connector tower 204 between the cover assembly 202 and the x-ray tube 206. The connector 208 can include pins, ports, or other electrical connections to the base of the x-ray tube 206, such as pins extending from an electrical interface surface 325 of the connector 208 through a gasket 321 and into the end of the x-ray tube 206. Generation of x-rays within the x-ray tube 206 can generate heat and lead to thermal expansion of the gasket 321 and/or other thermally expandable components of the x-ray tube 206. The cover assembly 202 can be configured to absorb thermal expansion of the gasket 321 or other connector components at the interface with the x-ray tube 206.

As further shown in FIG. 3A, the cover assembly 202 includes an outer plate 312, an inner plate 314, a biasing mechanism 316, a retainer 318 (e.g., a retainer shaft), and a clip 331. The biasing mechanism 316 can be secured between the outer plate 312 and the inner plate 314.

The outer plate 312 can be referred to as a spanner nut, and the cover assembly 202 can be referred to as a spanner nut assembly. The outer plate 312 can include materials such as metal, including steel or stainless steel. The outer plate 312 can include a flange 424 which extends radially outward from the circumference of the outer plate 312 longitudinally (along a longitudinal axis 343) above the thread 320.

The inner plate 314 can be referred to as a thrust plate. Longitudinally moving the inner plate 314 relative to the outer plate 312 may compress and decompress the biasing mechanism 316. As used herein, the biasing mechanism and resilient mechanism may be used interchangeably. In some embodiments, the inner plate 314 can include a material that allows the biasing mechanism 316 to slide or slip smoothly along the surface of the inner plate 314 while the biasing mechanism 316 is being compressed or decompressed. For example, the inner plate 314 may comprise an oil-impregnated material, bushing-grade brass, Teflon, polymer/plastic, or other durable, low-friction material that allows slippage at the interface with the connector 208 and between the biasing mechanism 316 and the inner plate 314.

The biasing mechanism (or resilient mechanism) 316 can enable the inner plate 314 to move both longitudinally away from and towards the outer plate 312 to account for the thermal expansion of the gasket 321 (and other thermally expandable components) of the x-ray tube 206. The biasing mechanism 316 can allow a distance between the inner plate 314 and the outer plate 312 to be variable to permit thermal expansion while maintaining uniform pressure and a seal. The biasing mechanism 316 can be a spring-type mechanism made of steel or other shape-memory alloy.

The cover assembly 202 can serve to compress the connector 208 against the connector interface 323/325 of the x-ray tube 206, either with or without the gasket 321. In some examples with a gasket 321, the compression maintains an even-pressure seal between the gasket 321 and the tube of the x-ray assembly 206 while simultaneously allowing for a predetermined amount of thermal expansion of gasket 321 and/or other thermally expandable components of the x-ray tube 206. In addition or alternatively, the x-ray tube 206 may include other features (other than the gasket 321), such as a sealable and/or insulating semisolid (or solid) lubricant or grease. In another example, the connector 208 can include a compressible portion, thus taking the place of the gasket 321. In these cases, the cover assembly 202 can compress the compressible portion of the connector 208 against a portion of the x-ray tube 206 or an x-ray tube 206.

The outer plate 312 can include a thread (first coupling portion) 320 which can be mated with a thread (second coupling portion) 322 of the connector tower 204 in order to attach the cover assembly 202 to the connector tower 204. In one example, the threads 320 and 322 can each comprise corresponding and engageable threads around the circumference of the outer plate 312 and the connector tower 204.

In some examples, the thread 320 of the cover assembly 202 can be a double-start thread to facilitate engagement with the thread 322. In other examples, the thread 320 can be single-start or multi-start (three-start, four-start, etc.). A two-start thread includes two intertwined threads running in parallel. A three-start thread includes three intertwined threads running in parallel. A four-start thread includes four intertwined threads running in parallel. An N-start thread includes N intertwined threads running in parallel.

For example, the first thread 320 can include a single male thread while the second thread 322 can include a single female thread, or vice versa. The threads of the threads 320, 322 can engage each other to attach the outer plate 312 to the connector tower 204 via rotational movement about a longitudinal axis 343 of the connector retainer cap assembly 200 extending vertically through the components shown in FIG. 3A. The rotational movement of the outer plate 312 relative to the connector tower 204 may drive longitudinal movement of the outer plate 312 toward the connector tower 204. In some embodiments, the threads 320 and 322 can comprise a twist-lock lock coupling mechanism or other appropriate joining mechanism to couple the cover assembly 202 to the connector tower 204.

Engageable threads that are disposed around the circumference of the larger diameter outer plate 312 and connector tower 204 (e.g., single threads) can provide an increased shear strength compared to configurations in which the outer plate is coupled to the housing via multiple smaller bolts with smaller diameters. Due to the larger diameter, the threads of the outer plate 312 may have a larger pitch (or more course threads than fine threads) with a larger thread depth than multiple smaller bolts. In some examples, the outer plate 312 may have greater than 12 threads/inch (5.5 millimeter (mm) pitch) or greater than 6 threads/inch (2 mm pitch). In some examples, the increase in shear strength due to the larger diameter can result in approximately a ten-fold increase compared to multiple smaller bolts. For example, the shear strength of thread engagement of the larger diameter thread can be approximately 693 kilo-Newtons (kN) while the shear strength of thread engagement of a single smaller diameter bolt can be approximately 70 kN. In some examples, the increase in shear strength for the larger diameter thread compared to the smaller diameter thread can range from being approximately five to fifteen times greater than the shear strength for the smaller diameter thread.

In some embodiments, the cover assembly 202 can also be enabled to couple with a tool for adjusting the position of the cover assembly 202 relative to the connector tower 204. In one example, an exterior surface of the cover assembly 202 (e.g., a surface that is exposed to the user while installing the cover assembly 202 to the connector tower 204) can include features (e.g., protrusions or notches) that allow the cover assembly to be rotated relative to the connector tower 204). For example, the cover assembly 202 can include a screw head (e.g., having a cross-, hex-, or slot-shaped recess in its top surface (e.g., surface that is distal to the x-ray tube 206)) or nut (e.g., a square, hexagonal, or octagonal set of radially-outward-facing surfaces) to which a tool (e.g., a wrench, ratchet, key, screwdriver, or the like) can be coupled in order to tighten threads of the cover assembly 202 to threads of the connector tower 204. Additionally or alternatively, the circumference (or outer perimeter) of the cover assembly 202 can include knurling or other abrasive features to facilitate hand tightening of the cover assembly 202 to the connector tower 204. As used herein, a first part may be "coupled" to a second part when the two parts are joined to each other, directly or indirectly. As used herein, parts may be "directly coupled" if the parts are in direct contact with each other or otherwise affixed to each other without intervening parts, the parts may be "slidably coupled" if the parts can slide relative to each other while contacting each other, and the parts may be "rotatably coupled" if the parts can rotate relative to each other while being joined to each other.

The connector tower 204 can be configured for coupling with the x-ray tube 206. Further, the connector cable 210 can be configured for coupling with the gasket 321, and the gasket 321 can be configured for coupling with a connector plate 323 coupled to or part of in a base housing 327 of the x-ray tube 206. In particular, the connector tower 204 can be configured for coupling with the base housing 327. For example, the connector tower 204 can include openings 329 or slots through which fasteners (e.g., screws, bolts, pins, and the like) can be fitted in order to secure the connector tower 204 to the base housing 327.

In some examples, the base housing 327 include an attachment portion 333 which can include features such as threads, holes, etc. to which the fasteners can be secured. In the cross-section of FIG. 4, an example fastener 335 (e.g., a bolt) is shown extending through one of the openings 329 in the connector tower 204. In some embodiments, the connector plate 323 and/or the inward-facing surface 325 of the connector 208 can be directly attached to and abutting the gasket 321. Accordingly, the gasket 321 can provide an even seal at the connector interface 323/325 between the inward-facing surface 325 of the connector 208 and the outward-facing surface of the plate 323. In some arrangements, the gasket 321 may be permanently fixed to (or an integral part of) the base housing 327. The connector plate 323 and the base housing 327 can form at least a portion of a wall to create a vacuum seal of the x-ray tube 206.

Figure 3B:
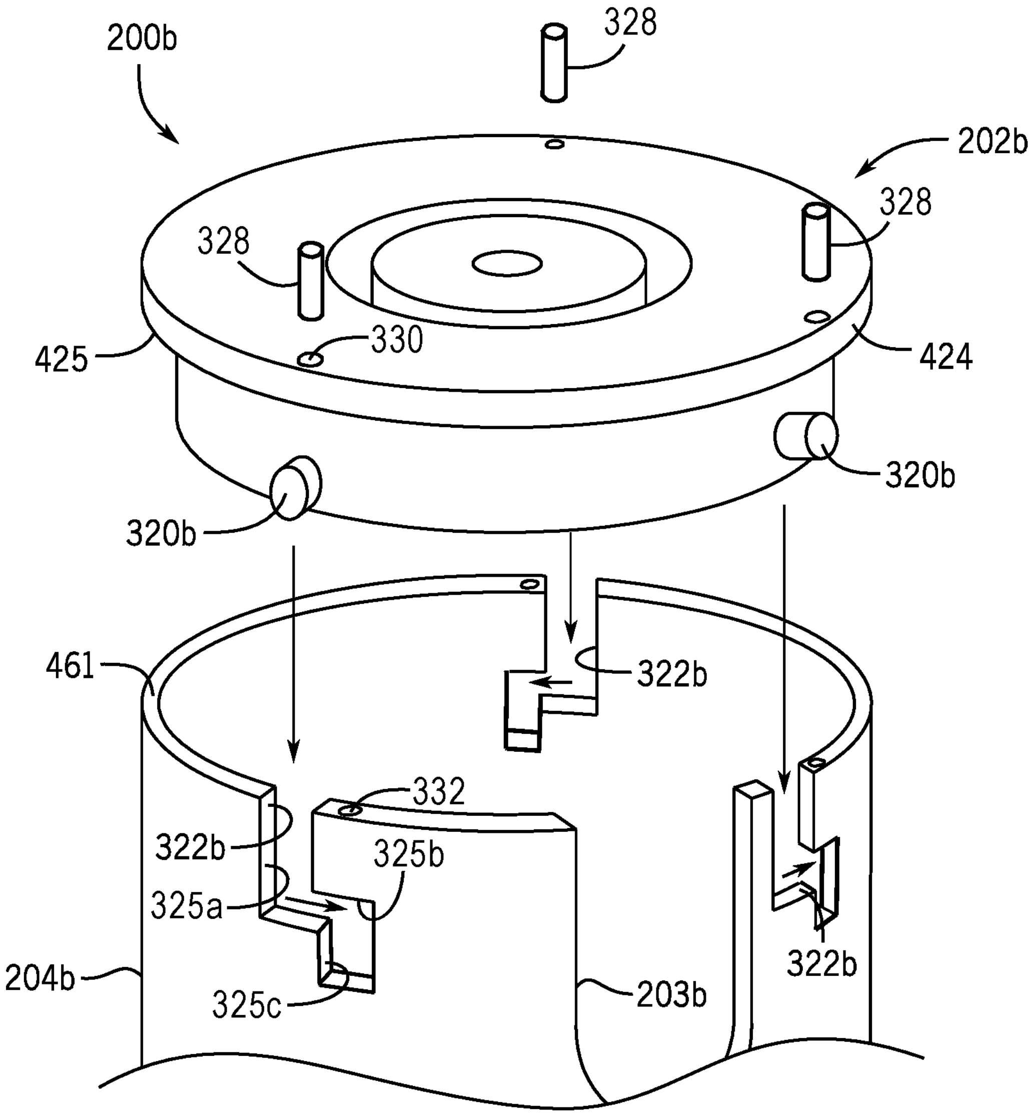
FIG. 3B shows an exploded view another example of a cable connector retainer cap assembly.

In at least one embodiment, the connector retainer cap assembly 200 is configured to couple the cover assembly 202 to the connector tower 204. In one example, the cover assembly 202 and the connector tower 204 can each be fitted with one of a set of engageable threads. In another example, a portion of the cover assembly 202 can fit within the connector tower 204 and can be secured by friction. In another example, the cover assembly 202 and/or the connector tower 204 can include twist locks (e.g., a twist lock, such as a j-lock connector, lacking any threads), bayonet connector, retention clips, latches, pins, buttons, a single-turn connector, similar fasteners, or combinations thereof to secure the cover assembly 202 to the connector tower 204. FIG. 3B, discussed below, illustrates an alternative j-lock connector embodiment.

In at least one embodiment, as illustrated in FIGS. 3A-7, the flange 424 of the outer plate 312 has a longitudinally-inward-facing stop surface 425 which is configured to come into contact with a longitudinally-outward-facing stop surface 461 at the outer/distal end of the connector tower 204. The stop surface 425 can mechanically impede or stop the movement of the outer plate 312 when the outer plate 312 contacts stop surface 461 and can thereby limit advancement of the cover assembly 202 relative to the connector tower 204 (e.g., when the thread 320 is coupled to and tightened with the thread 320) at a predetermined position. When the outer plate 312 is secured as closely as possible to the connector tower 204 as allowed by the flange 424, the inner plate 314 can abut the longitudinally outward-facing surface of the connector 208, and the biasing mechanism 316 can be compressed against the outer plate 312. In this compressed position, the connector 208 may be pressed against the base of the x-ray tube 206 to form an interface 323/325 (e.g., a seal). In this fashion, the cover assembly 202 applies pressure to the connector 208 at a predetermined position, thereby reducing or eliminating any risk of over-tightening the threads 320/322 and thereby applying an undesired amount of force to the connector 208. Instead, the cover assembly 202 ensures consistent tightening and application of a consistent amount of force to the cable connector 208 each time the cover assembly 202 is coupled to the connector tower 204.

The connector retainer cap assembly 200 may be used to secure a high voltage connector (e.g., a connector and an associated cable) to an x-ray housing (e.g., base housing 327) or insert 134 of an x-ray source, such as an x-ray tube 206. Conventionally, the insert refers to the vacuum envelope of the x-ray tube, and the x-ray housing refers to the structure surrounding the vacuum envelope with radiation shielding and features to cool the x-ray tube, such contain dielectric or cooling oil. The connector retainer cap assembly 200 can include a cover assembly 202 and a connector tower 204. The connector retainer cap assembly 200 can be configured to secure an interface 325 of the connector 208 of a connector cable 210 to a mating interface or connector plate 323 of an insert 134 or base housing (e.g., 327) of the x-ray tube 206. The electrical interface surface 325 of the connector 208 and the connector plate 323 of the insert or housing forms a connector interface 323/325. The connector tower 204 can be referred to as a connector retainer, cable tower, or connector shell. The connector tower 204 can receive the connector 208 and hold the connector 208 in place relative to the x-ray tube 206. The connector 208 can include a flat connector, a conical connector, or other connector for operation under high voltages.

Figure 4:
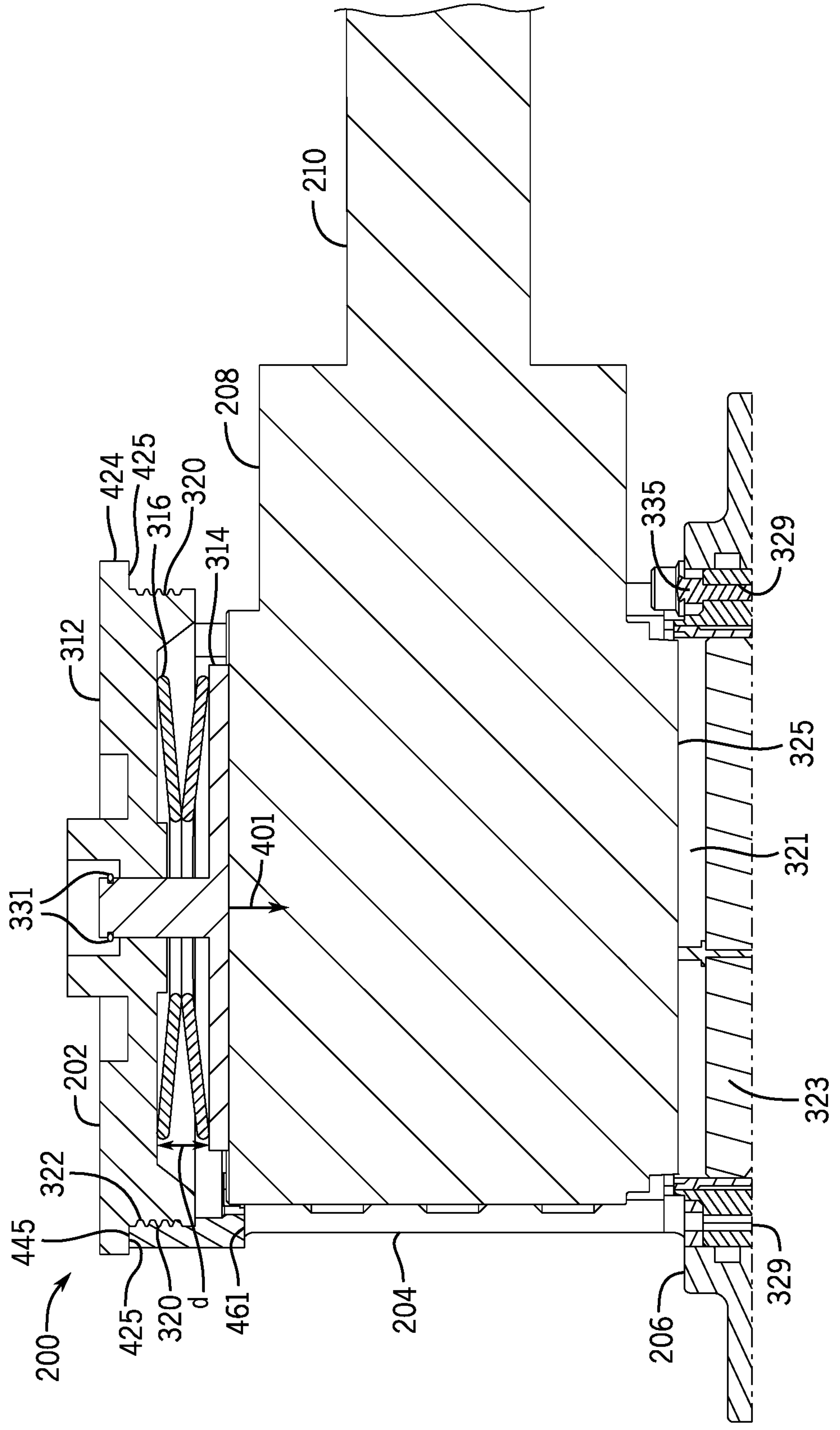
FIG. 4 shows a side cross-sectional view of the cable connector retainer cap assembly of FIG. 2.

FIG. 4 depicts the connector 208 secured to the x-ray tube 206 with the connector cable 210 extending laterally outward from the connector tower 204. The connector cable 210 and the connector 208 can be secured within the connector tower 204, and the inward-facing surface 325 of the connector 208 can be pressed toward the connector plate 323 of x-ray tube 206 (e.g., against the gasket 321) by the cover assembly 202. The cover assembly 202 can exert a force 401 to secure the connector 208 of the connector cable 210 to the x-ray tube 206.

In at least one embodiment, the connector tower 204 may be configured for retaining the connector cable 210 while the cable extends laterally or radially away from the central axis 343 or a biasing direction, where the biasing direction is in the same direction as or parallel to the central longitudinal axis 343. In one example, referring to FIG. 5, a side wall of the connector tower 204 can include a cutout 203 or gap to receive the connector cable 210. The cutout 203 or gap feature may be shaped similar to, and may at least partially follow the outer profile of, the outer shape of the connector cable 210. In one example, the cutout 203 can have a substantially "U"-shaped profile, wherein the connector cable 210 extends through the bottom (e.g., proximal to the x-ray tube 206) of the "U" shape and the "U" shape is substantially similar to the curvature of the connector cable 210. In other examples, the cutout 203 can have a half circle or half ellipse profile. The shape of the cutout 203 through the connector tower 204 can reduce the mechanical rotation of the cable 210, thereby improving its stability while retained in the connector tower 204. Furthermore, the cutout 203 can act as an index or a guide to ensure proper alignment of pins of the x-ray tube 206 and receptacles of the connector 208 (or in other examples, pins of the connector and receptacles of the x-ray tube) to prevent bending or damaging the pins during installation of the connector 208 within the connector tower 204. In some examples, the cutout 203 can be configured to receive the connector cable 210 while allowing the connector tower 204 to maintain structural integrity to secure the connector 208 and the connector cable 210. Furthermore, in some examples, the cutout 203 can be positioned in a break or interruption of the thread 322 of the connector tower 204 while still allowing for the cover assembly 202 to couple to the connector tower 204

In at least one embodiment, the connector tower 204 may be configured for facilitating convective cooling (represented by dashed arrows 253 indicating airflow) of the connector 208 when the connector is positioned in an interior of the connector tower 204. For example, the interior of the side wall of the connector tower 204 can include lateral cutouts or openings 255 through which airflow 253 can pass between the interior of the connector tower 204 and the exterior of the connector tower 204. The airflow can pass over the connector cable 210 to improve its cooling capability. In some embodiments, the lateral cutouts may be formed as openings 255 through which the cable 210 does not extend, such as openings 255 to the lateral sides of the connector 208.

Additionally or alternatively, an interior surface of the sidewall of the connector tower 204 can include a series of undulating ridges 201 (e.g., bumps), or grooves 239 that can facilitate circumferential airflow (represented by arrows 253) within the connector tower 204 around the connector 208 to additionally cool the connector tower 204 and the connector 208.

In at least one embodiment, the connector tower 204 is configured for attachment to the x-ray tube 206. For example, the connector tower 204 may include a proximal end 357 configured to be fastened to an insert or a housing of the x-ray tube 206. The proximal end 357 of the connector tower 204 can include at least one retention portion 241 that is secured to the x-ray tube 206. For example, the connector tower 204 can include pre-drilled holes or openings 329 used to receive screws, bolts, pins, and the like to couple the connector tower 204 and the x-ray tube 206 to each other where the gasket and x-ray tube 206 are located. The pre-drilled holes 329 are further described in reference to FIG. 4. The retention portion 241 may beneficially provide a basis for mounting the connector tower 204 in place relative to the x-ray tube 206 and for keeping the connector tower 204 from being dislodged from the x-ray tube 206 when a biasing member (as described in reference to FIGS. 3-4) of the connector retainer cap assembly 202 applies a longitudinal force opposite the forces fastening the retention portion 241 to the x-ray tube 206.

Figure 5:
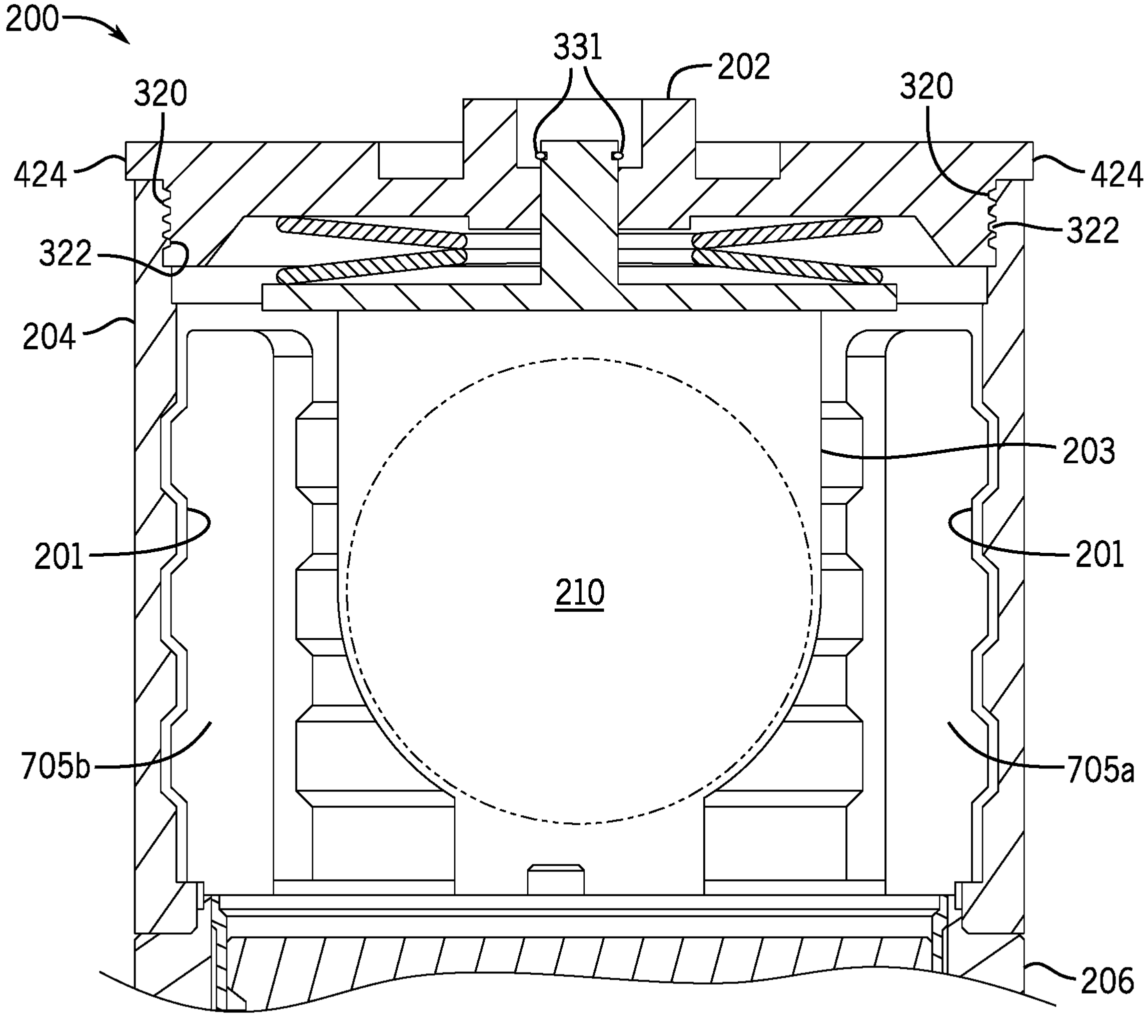
FIG. 5 shows a front cross-sectional view of the cable connector retainer cap assembly of FIG. 2.

FIG. 5 depicts the connector cable 210 (the cross section of which is represented as a dotted circle) extending (laterally) outward from the connector tower 204. The cover assembly 202 can exert a force to secure the connector 208 of the connector cable 210 to the x-ray tube 206.

In at least one example, the connector tower 204 can include at least one vent opening 705*a*, 705*b* (collectively referred to as vent openings 705). In some examples, the vent openings 705 can be laterally opening vent cutouts or side apertures. The vent openings 705 can facilitate cooling of the interior of the connector tower 204 and of the cable connector 208. In some examples, the number, size, shape, and position of vent openings 705*a*-*b* can be determined based on factors such as maintaining the structural integrity of the connector tower 204, a heat-distribution profile generated by the connector 208, and the like. Furthermore, the interior of the connector tower 204 can include a network of circumferentially-extending ridges 201 that form gaps between the outer surface of the connector 208 and the inner surface of the walls of the connector tower 204 that can facilitate airflow within the connector tower 204 to additionally cool the connector tower 204 and the connector cable 210 while providing circumferential support of the connector 208.

FIG. 3B shows an exploded view of an embodiment of a cable connector retainer assembly 200*b* showing an alternative connection system for joining a cover assembly 202*b* to a connector tower 204*b*. The cover assembly 202*b* can be configured to be engaged with the connector tower 204*b* without threads 322/320 and instead uses a set of pins 320*b* (e.g., radial protrusions or male portions) and a corresponding set of zigzag, L-, or j-shaped channels 322*b* (e.g., radial openings, slots, recesses, or female portions).

The channels 322*b* can receive and engage the pins 320*b*. Each of the channels 322*b* may include a first, longitudinally-extending section (e.g., 325*a*) to receive a corresponding pin 320*b* as the pin 320*b* moves longitudinally downward into the channel 322*b*, and each channel 322*b* may include a second, circumferential section (e.g., 325*b*) to engage the corresponding pin 320*b* when the cover assembly 202*b* is axially rotated with respect to the connector tower 204*b* (e.g., about axis 343). Optionally, a third, longitudinally-extending section (e.g., 325*c*) can extend proximally/longitudinally from the second, circumferential section as well. Once the pins 320*b* are axially rotated into the second, circumferential sections, the pins 320*b* may prevent longitudinal withdrawal of the cover assembly 202*b* away from the connector tower 204*b*. Additionally, the size and positioning of the channels 322*b* can define the final position of the cover assembly 202*b* relative to the connector tower 204*b* in a manner that prevents the possibility of over-tightening (e.g., if threads were used instead) or other over-compression of the biasing mechanism 316.

Furthermore, in some embodiments, the assembly 200*b* may optionally include a set of fasteners 328 configured to fix the cover assembly 202*b* in place relative to the connector tower 204*b* once the pins 320*b* are within the third, longitudinally-extending sections (e.g., 325*c*) of the channels 322*b*. Rotation of the pins 320*b* within the second sections 325*b* of the channels 322*b* may longitudinally align openings (e.g., 330) through the cover assembly 202*b* with openings (e.g., 332) of the connector tower 204*b* once the pins 320*b* reach the ends of the second sections 325*b* (above the third sections 325*c*). Then, as fasteners 328 are installed and tightened through the openings 330, 332, the third sections (e.g., 325*c*) may maintain alignment of the openings in the cover assembly 202*b* and the connector tower 204*b* as the pins 230*b* move proximally into the third sections 325*c*. In some embodiments, the proximal/bottom end surfaces of the third sections 325*c* can act as a mechanical stop for the pins 320*b* to prevent over-tightening or over-displacement of the cover assembly 202*b* relative to the connector tower 204*b*.

Alternatively, the cover assembly may comprise the female portion of the j-lock, e.g., including channels 322*b*, and the connector tower may comprise the male portion of the j-lock, e.g., including pins 320*b*. In some embodiments, the number of protrusions 320*b* may equal the number of channels 322*b*. For example, there can be two or more protrusions 320*b* and a corresponding two or more channels 322*b*. In some embodiments, the number of protrusions can be less than the number of channels.

Figure 6:
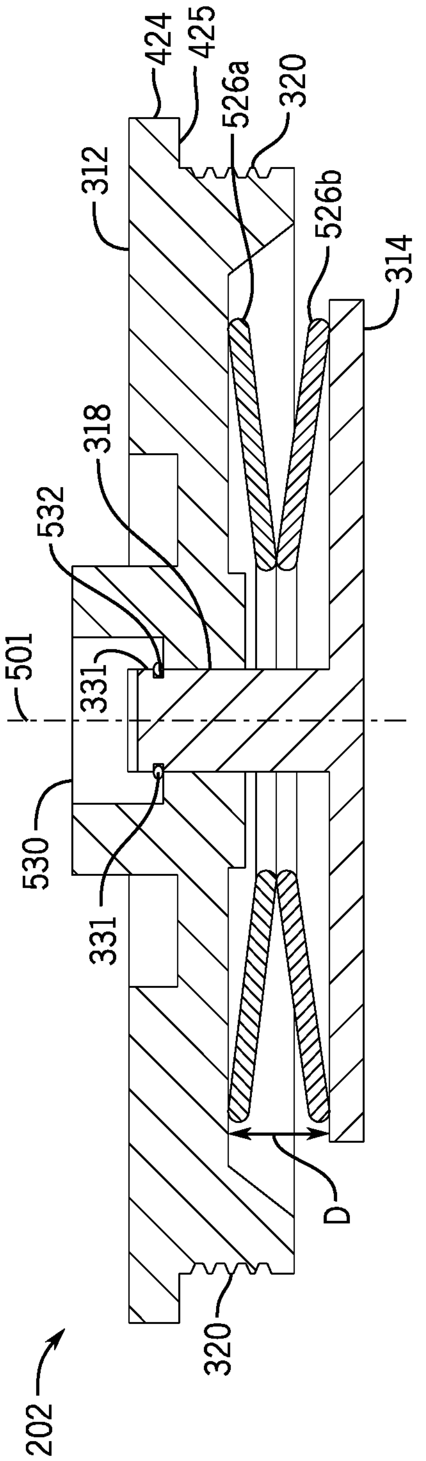
FIG. 6 shows a side cross-section of a cover assembly including a first disc spring and a second disc spring, according to one embodiment.

FIG. 6 shows a cross-section of the cover assembly 202 isolated from the rest of the connector retainer cap assembly 200. The cover assembly 202 may be used with other connector retainer cap assemblies having different construction from connector retainer cap assembly 200. The biasing mechanism 316 may comprise one or more disc springs, such as Belleville springs or compression washers/springs. The cover assembly 202 can include a first disc spring 526*a* and a second disc spring 526*b* as the biasing mechanism 316 and may also include the outer plate 312, the inner plate 314, the retainer 318, and the clip 331.

The cover assembly 202 can be attachable to a connector housing, such as the connector tower 204 described above. In particular, the outer plate 312 can be removably attachable to a distal end 359 of the connector housing, and the inner plate 314 can be positioned within the connector housing. The outer plate 312 can be coupled with the connector housing along a central longitudinal axis 501 of the inner plate 314.

The retainer 318 can couple the inner plate 314 to the outer plate 312 and can limit displacement of the inner plate 314 away from the outer plate 312 to a maximum distance by preventing decoupling of the inner plate 314 from the outer plate 312. FIG. 6 shows the maximum distance D that the inner plate 314 is displaceable relative to the outer plate 312. The clip 331 can limit displacement of the inner plate 314 relative to the outer plate 312 by mechanical interference with an outer (e.g., top) surface of the outer plate 312. As comparatively shown in FIG. 4, when the cover assembly 202 is attached to the connector tower 204 and applies pressure to the connector 208, the springs may be compressed, the distance may be reduced (e.g., to distance d in FIG. 4, which is less than maximum distance D), and the clip 331 may be displaced upward and away from the top surface of the outer plate 312.

In some embodiments, at the maximum distance D, the disc springs are not tensioned and do not exert a biasing force between the inner plate 314 and the outer plate 312. In other embodiments, the disc springs 526*a-b* can provide a biasing force pushing the inner plate 314 away from the outer plate 312, even at the maximum distance D. Thus, in some embodiments, the springs 526 may have a pre-load when the plates 312, 314 are secured to each other. In at least one example, the retainer 318 (e.g., a stem, retainer shaft, or guide shaft) is coupled to the inner plate 314 and extends into or through an aperture 530 of the outer plate 312. The retainer 318 and the aperture 530 centrally align the inner plate 314 and the outer plate 312. In at least one example, the aperture 530 is a guide opening used to align the inner plate 314 relative to the outer plate 312.

The retainer 318 can include a retention feature 532 to retain the clip 331 or another retention device to limit the displacement between the inner plate 314 and the outer plate 312 to the maximum distance D. For example, the retention feature 532 may be a recess or hole to receive a retaining clip (e.g., clip 331) or pin. When the retaining clip or pin is installed in the retention feature 532, the stem 528 may be mechanically prevented from being removed from the aperture 530 unless the retaining clip or pin is removed due to the combined diameter of the stem 528 and clip being greater than the diameter of the opening through which the stem extends. Alternatively, the retention feature 532 may include protrusions, bumps, extensions, similar features, and combinations thereof to prevent the retainer 318 from being decoupled from the aperture 530 (e.g., by its shaft being removed from the aperture 530).

An outer plane formed by the outer circumference of the conically-shaped disc spring may be displaceable from the inner plane formed by the inner circumference of the conical shaped disc spring. The disc springs 526*a-b* may be stacked and oriented so that their laterally inner circumferences are between their outer circumferences, thereby causing their conical shapes to open respectively upward (for 526*a*) and downward (for 526*b*), as shown in FIG. 6. This may be referred to as a concave configuration since the concave portions of the springs open longitudinally outward relative to each other. Alternatively, the laterally inner circumferences of the disc springs may be respectively positioned at the top and bottom of the stack, and the outer circumferences can be between the inner circumferences, thereby forming a diamond-like shape that may be referred to as a convex configuration. In some embodiments, the disc springs may be stacked in a "nested" series configuration, wherein the disc springs are both oriented in the same direction. For example, disc spring 526*a* could be vertically flipped to have the same orientation as disc spring 526*b* and then positioned between disc spring 526*b* and the outer plate 312. Thus, the disc springs 526*a-b* can both open downward with one of the disc springs being at least partially received within the other disc spring. Similarly, in another configuration, the disc springs 526*a-b* can both open upward when stacked on top of each other.

As shown in FIG. 6, the first disc spring 526*a* and the second disc spring 526*b* are disposed in a concave configuration between the outer plate 312 and the inner plate 314 to bias the outer plate 312 away from the inner plate 314 (or equally, bias the inner plate 314 away from the outer plate 312). Applying the disc springs in a concave configuration may apply a greater uniform force to the outer circumference of the inner plate 314 than using a convex configuration. In particular, the inner plate can be biased longitudinally downward/inward toward the interior of the connector tower 204 where the connector 208 is located. The biasing of the outer plate 312 and the inner plate 314 can occur along the central longitudinal axis 501 of the inner plate 314.

In some embodiments, the disc springs can be Belleville springs or conical compression washers which can elastically deform (i.e., flatten and expand) and function as at least one spring with a high and substantially uniform spring constant within certain compression ranges. Disc springs can be utilized independently (e.g., the biasing mechanism can include one of the first disc spring 526*a* or the second disc spring 526*b*), or as a stack of springs. In the example depicted in FIG. 6, the first disc spring 526*a* and the second disc spring 526*b* are stacked in series, meaning that the concave direction of the first spring 526*a* is opposite to the concave direction of the second spring 526*b*. In other terms, the deflection of the first spring 526*a* is opposite to the deflection of the second spring 526*b*. In some examples, disc springs can be positioned in parallel, with the concave direction of the first spring 526*a* being aligned with the concave direction of the second spring 526*b*. See also springs 630*a-b* in FIG. 7 and their descriptions below. In other terms, the deflection of the first spring 526*a* and the deflection of the second spring 526*b* can be in the same direction. In other examples, when there are more than two disc springs, the stack can be a combined parallel/series stack in which some of the disc springs are positioned in a parallel arrangement while others are stacked in a series arrangement. In any configuration of stacking of the disc springs, the force exerted on the top (e.g., distal) surface of the inner plate 314 can be rotationally symmetric.

The disc springs 526*a* and 526*b* flatten and expand when elastically deformed and have a continuous contact between the outer circumference of the disc spring 526*b* and the surface of the inner plate 314.

In at least one example, at least one of the first disc spring 526*a* and the second disc spring 526*b* can be preloaded (e.g., under a predetermined, non-zero, minimum amount of compression) when the displacement of the inner plate 314 away from the outer plate 312 is at its maximum predetermined distance. In some examples, the disc springs 526 (e.g., the biasing mechanism) can be preloaded such that the effective spring force exerted by the biasing mechanism due to additional compression arising due to securing the connector 208 within the connector tower 204 is substantially constant with the degree of compression. In one example, the force can be constant (or substantially constant) to within about 0.01% deflection. In another example, the force can be constant (or substantially constant) to within 0.5% deflection. In another example, the force can be constant (or substantially constant) to within 1% deflection. In another example, the force can be constant (or substantially constant) to within about 10% deflection.

Figure 7:
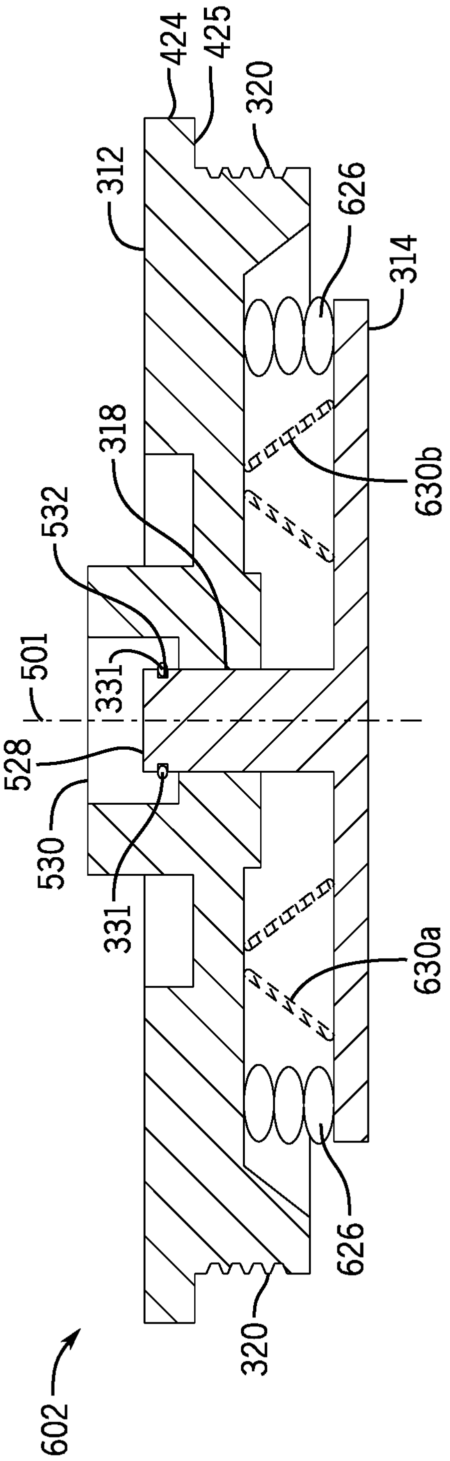
FIG. 7 shows a side cross-section of a cover assembly including a first biasing mechanism and a second biasing mechanism, according to one embodiment.

FIG. 7 shows a cover assembly 602 that includes a coil-type biasing mechanism 626, according to one embodiment. Thus, the biasing mechanism 626 may comprise a compression spring. The cover assembly 602 can be similar to the cover assembly 202 disclosed in connection with other embodiments herein. In various cases, the biasing mechanism 626 can include one or more linear springs, torsion springs, leaf springs, gas springs, or the like. The biasing mechanisms 626 can be selected and configured to have specific forces over certain deflection values as required. Furthermore, the number of biasing mechanisms 626 can be selected as one, two (as depicted), three, four, or more as required. In some examples, a gas spring can be a nitrogen gas spring which includes self-contained cylinders that are pre-charged to the desired force. If force adjustment is later required, the gas spring can be recharged and adjusted accordingly.

FIG. 7 also shows an alternative embodiment wherein a pair of disc springs 630*a-b* are arranged in parallel with each other between the outer plate 312 and the inner plate 314. The disc springs 630*a-b* each contact a proximal-facing/bottom surface of the outer plate 312 and a distal-facing/top surface of the inner plate 314 rather than being stacked. The parallel-arranged disc springs 630*a-b* can be two of a plurality of disc springs 630*a-b* (e.g., 3, 4, or more) arranged spaced circumferentially around the central longitudinal axis 501 of the cover assembly 602. In this manner, the disc springs 630*a-b* can evenly spread out pressure applied to the inner plate 314 from various points surrounding the longitudinal axis 501. The disc springs 630*a-b* are shown in broken lines in FIG. 7 to illustrate that they may be used separate from, or in addition to, the coiled biasing mechanism 626. Additionally, as explained above, disc springs 630*a-b* may be used in addition to springs 526*a-b*. Furthermore, each disc spring 630*a*, 603*b* may comprise a set of multiple series-arranged/stacked springs (e.g., disc springs), and those separate sets of springs can be spaced around the axis 501 to apply biasing forces in parallel to each other. The cover assembly 602 may use other types of springs arranged in parallel instead of the disc springs 630*a-b*, such as by using coil springs, leaf springs, or other types of springs disclosed elsewhere herein.

Figure 8:
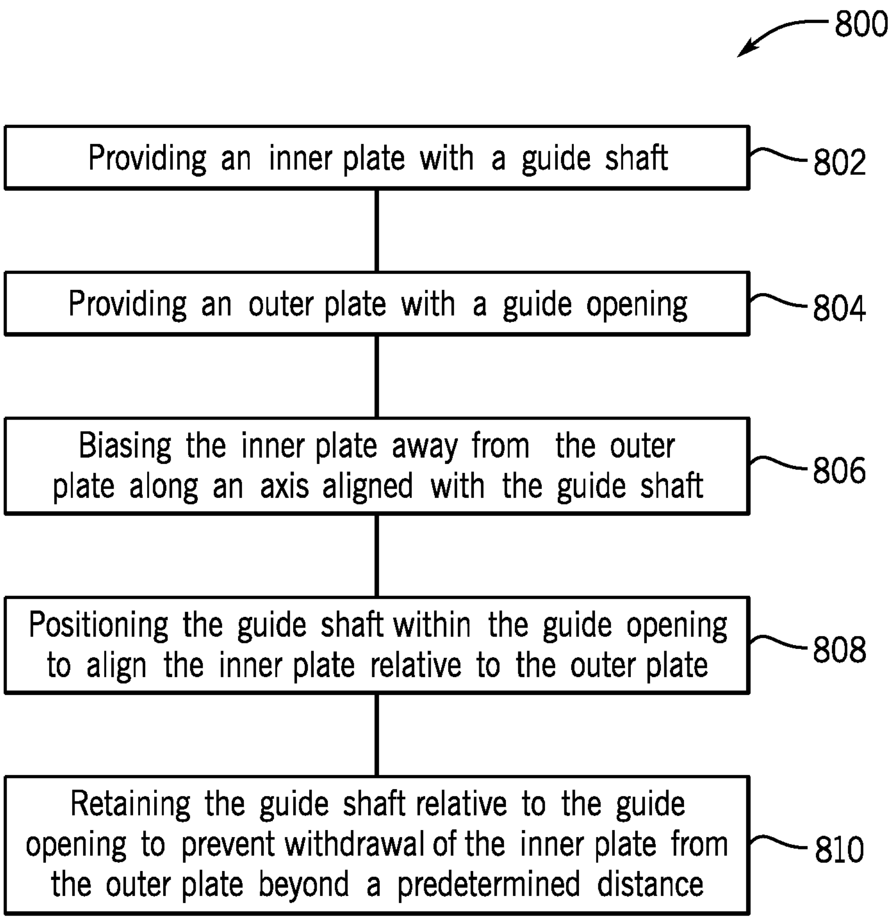
FIG. 8 is a diagram illustrating a method for assembling a connector assembly.

FIG. 8 is a diagram of a method 800 for assembling a connector assembly (e.g., 200) according to one embodiment. Any of the features, components, and/or parts described in FIG. 8 can be included, either alone or in any combination, in any of the other examples of devices, features, components, and parts shown in the other figures. Likewise, any of the features, components, and/or parts, shown and described with reference to the other figures can be included in the example of the devices, features, components, and parts described in FIG. 8.

The method 800 can include providing an inner plate (e.g., 314) with a guide shaft (e.g., part of retainer 318), as provided in block 802, providing an outer plate (e.g., 312) with a guide opening (e.g., aperture 530), as provided in block 804, biasing the inner plate away from the outer plate (e.g., via a biasing mechanism 316, 526*a-b*, 630*a-b*, etc.) along an axis (e.g., axis 343 or 501) aligned with the guide shaft, as provided in block 806, and positioning the guide shaft within the guide opening to align an inner plate relative to an outer plate, as in block 808. A biasing mechanism can be positioned between the inner plate and the outer plate prior to assembly of the inner plate to the outer plate. The guide shaft can include the retainer 318 and/or the retention feature 532. The guide opening can be the aperture 530 of the outer plate 312. The guide shaft within the guide opening can guide the movement of the inner plate relative to the outer plate along a longitudinal axis of the system and can substantially prevent tilting of the inner plate relative to the outer plate. For example, the guide shaft can have a size and shape that corresponds to the size and shape of the guide opening in a manner that limits rotation of the guide shaft within the guide opening due to mechanical interference between the guide shaft and the guide opening. The length of the guide shaft and the length of the guide opening may be large enough to substantially prevent rotation of the guide shaft relative to a lateral/horizontal axis so that the guide shaft is substantially limited to translation along its longitudinal/vertical axis (e.g., 343 or 501).

The method may also include biasing the inner plate away from the outer plate along an axis (e.g., 343 or 501) aligned with the guide shaft, as in block 806. In at least one example, biasing the inner plate away from the outer plate includes positioning a spring (e.g., 316, 526*a-b*, 626, or 630*a-b*) between the inner plate and the outer plate. A spring as described herein can refer to one or more springs described in connection with FIGS. 4-7.

The method may also include retaining the guide shaft relative to the guide opening to prevent withdrawal of the inner plate from the outer plate beyond a predetermined distance, as in block 810. In at least one example, retaining the guide shaft relative to the guide opening (e.g., 530) includes attaching a retainer to the guide shaft external to the guide opening. The retainer can include one or more retention features (e.g., such as a retention groove and retention pin, clip 331, a cotter pin, a split pin, an R-clip, or the like).

In at least one example, the method further includes securing or coupling the outer plate to a housing, such as the connector tower 204. A stop surface 425 of the outer plate can engage a stop surface 461 of the connector tower 204. The stop surface 425 can be a flange which extends radially outward from a circumference of the outer plate. Although depicted herein as fully extending around the circumference of the outer plate, in some examples, the stop surface can extend around a portion of the circumference of the outer plate (such as 90%, 80%, 70%, 50%, 10%, etc.). In some examples, the stop surface can include multiple isolated portions that extend partially around the circumference of the outer plate (e.g., two portions each extending around 20% of the circumference, three portions each extending around 15% of the circumference, etc.).

In at least one example, securing the outer plate to the housing includes threading the outer plate to the housing. The outer plate can include a first thread (e.g., 320) which wraps around the circumference of the outer plate. The housing can include a second thread which wraps around the circumference of the housing. In one example, the first thread can be a male thread and can be mated with the second thread which can be a female thread. Alternatively the first thread can be a female thread and can be mated with the second thread which can be a male thread. Either of the first thread or the second thread can be single-start threads, double-start threads, or other multiply-start threads.

In at least one example, the method further includes positioning a connector within the housing, contacting the inner plate against the connector, and displacing the inner plate toward the outer plate. The inner plate can be displaced toward the outer plate by compressing the spring, which can occur when the inner plate is compressed against the connector. In this way, the connector can form a secure seal at the interface of the connection.

Figure 9A:
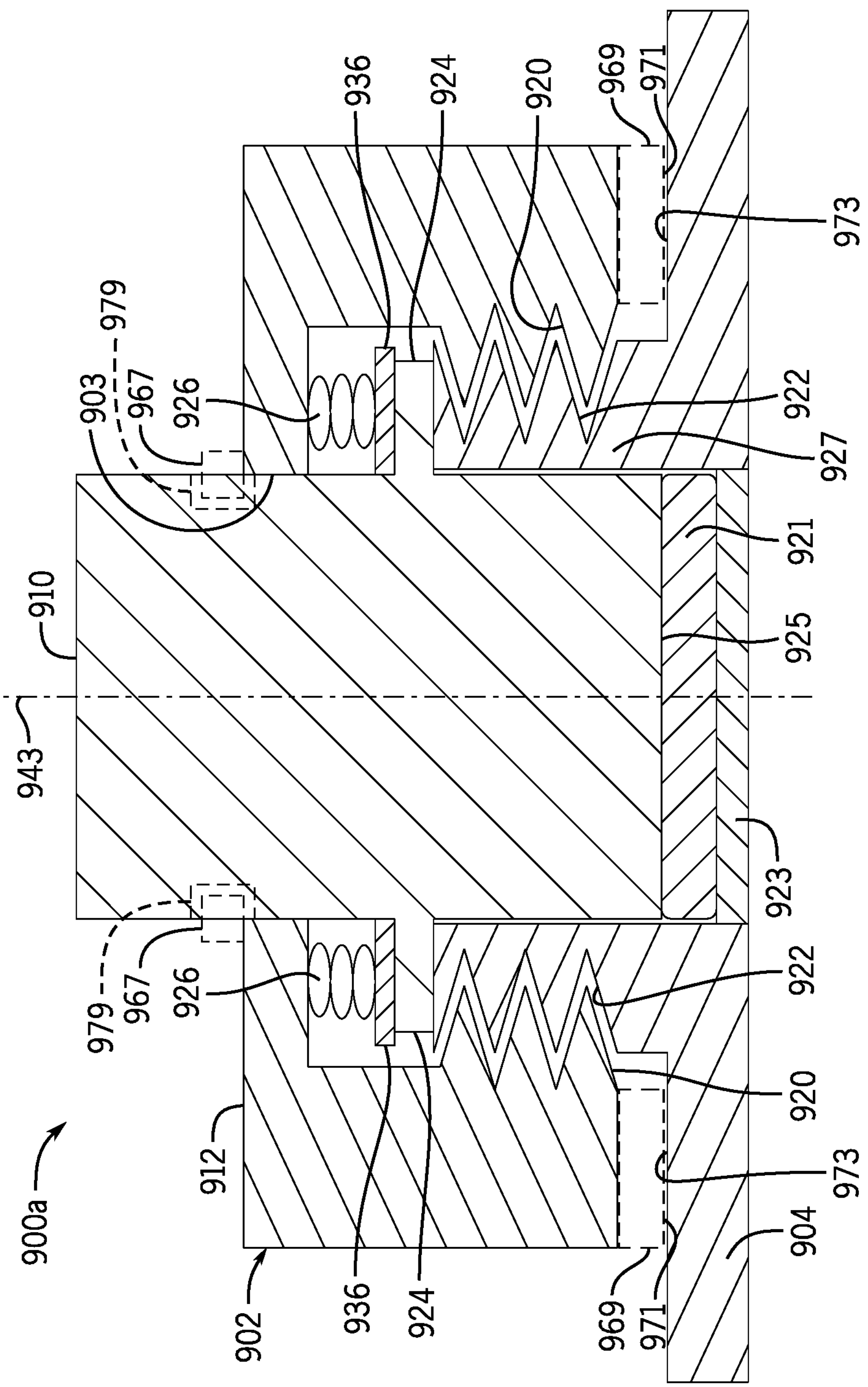
FIG. 9A illustrates a cable connector retainer assembly for receiving a connector cable longitudinally.

FIG. 9A illustrates a cable connector retainer assembly 900*a* for longitudinally or axially receiving a connector cable 910. The connector cable 910 can be a high voltage cable connector similar in function to the cable connectors (e.g., 208) described elsewhere herein. The connector cable 910 can have electrical interface surface 925, similar to the electrical interface surface 325 of the connector 208, that faces the x-ray tube 206. The connector cable 910 can be longitudinally inserted into connection with the x-ray tube 206 (i.e., along longitudinal axis 943), and the cable may extend away from the connection portion of the connector cable 910 along the longitudinal direction (i.e., along axis 943). Accordingly, the connector cable 910 can be referred to as a longitudinal connector cable, an axial connector cable, or a connector having a longitudinally aligned or extending cable.

The cable connector retainer assembly 900*a* may be used to secure the high voltage connector cable 910 to a housing 904 of an x-ray tube. The housing 904 may have common features with the x-ray tube 206 described elsewhere herein, such as by including a gasket 921 (similar to the gasket 321), an insulating plate 923 (similar to the connector plate 323), and other related components which at least partially secure a high voltage connector (e.g., 910) to the x-ray tube. The housing 904 may include a hollow shaft 927 extending from an outer surface thereof and surrounding the connection to the cathode of the x-ray tube, e.g., surrounding the insulating plate 923 and gasket 921. The shaft 927 of the housing 904 may comprise an outer or external thread 922 or other engagement device for connecting to cover assembly 902 of the cable connector retainer assembly 900*a*. The connector electrical interface surface 925 of the connector cable 910 and the insulating plate 923 of the x-ray tube 206 form a connector interface 923/925. The connector interface 923/925 may also include a gasket 921 positioned between the connector electrical interface surface 925 and the x-ray tube insulating plate 923 and may operate similarly to interface 323/325 in the manner discussed elsewhere herein.

The cable connector retainer assembly 900*a* can include a cover assembly 902 with an outer plate 912 with an interior having an internal/female thread 920 configured to engage the outer/external/male thread 922 of the housing 904. The cable connector retainer assembly 900*a* can also include a biasing mechanism 926 and a pressure plate (e.g., a washer 936). The outer plate 912 (and washer 936) may define a central longitudinal opening 903 through which the upper/distal part of the connector cable 910 extends along the longitudinal axis 943 of the assembly 900*a*. The distal part of the connector cable 910 (extending through the longitudinal opening 903) may be referred to as a guide shaft of the cable connector retainer assembly 900*a*. Thus, the connector cable 910 may extend centrally and longitudinally through the outer plate 912, biasing mechanism 926, and washer 936. The opening 903 may have a perimeter exactly or substantially matching the outer perimeter of the connector cable 910 where the opening 903 fits around the cable 910 so that the outer plate 912 can at least partially longitudinally slide along the cable 910. The cable 910 may extend outward/distally in a direction perpendicular to a distal planar surface of the outer plate 912.

In at least one embodiment, the thread 920 of the cover assembly 902 can engage the thread 922 of the housing 904 to exert a force on the connector cable 910. The force can ensure that the connector cable 910 forms an even pressure seal with the gasket 921 of the x-ray tube 906. The outer plate 912 can include one or more surface features or tool retention features such as knurling or gear-like ridges around an outer parameter of the cover assembly 902 to allow a user to tighten the cover assembly 902 to the housing 904. Additionally or alternatively, the outer plate 912 can include recesses on an exterior surface which can provide traction for a tool to tighten the outer plate 912 to the housing 904. Thus, the cover assembly 902 can implement the tool-adjustment features discussed in connection with connector retainer cap assembly 200.

When compressed, the biasing mechanism 926 can apply a biasing force against the washer 936, and thus to the cable 910 at flange 924, to maintain an even-pressure seal between the connector cable 910 and the x-ray tube at connector interface 923/925. In some embodiments, the biasing mechanism 926 maintains the seal between the connector cable 910 and the gasket 921 when the gasket 921 thermally expands due to heat generated by the x-ray tube. In other embodiments, the connector cable 910 may comprise a rubber or other elastic material, and the biasing mechanism 926 maintains the seal between the connector cable 910 and the x-ray tube without the gasket 921. The biasing mechanism 926 can include Bellville springs, linear springs, gas springs, or other suitable springs. In at least one embodiment, the biasing mechanism 926 can be disposed between a portion of the cover assembly (e.g., outer plate 912) and the washer 936. The washer 936 can be referred to as a thrust washer or pressure plate. Additionally or alternatively, the washer 936 can be an isolation washer which can electrically isolate the outer plate 912 from the connector cable 910.

In at least one example, the cable connector retainer assembly 900*a* can include a rigid retaining ring or flange 924 extending laterally from the structure of the connector cable 910. The flange 924 can be positioned between the shaft 927 of the housing 904 (i.e., longitudinally outward relative to the threaded portion 922 thereof) and the washer 936. The flange 924 of the connector cable 910 can therefore be installed in abutting, face-to-face contact with the distal end of the shaft 927 of the housing 904. In some embodiments, the bottom surface of the flange 924 may be spaced away from the top of the shaft 927 while the biasing force of the biasing mechanism 926 distributes a downward load against the connector interface 923/925, which may or may not include gasket 921. If a gasket 921 is not included, the connector interface 923/925 may be formed by contact between electrical interface surface 925 and insulating plate 923. The biasing force applied by the biasing mechanism 926 (via the washer 936) can clamp the inner or proximal end of the connector cable 910 toward the connector interface 923/925. In some embodiments, the washer 936 (or other pressure plate) may be adhered to or integrated with the flange 924 (e.g., epoxied, glued, or welded to the flange 924).

In the event of thermal expansion of the gasket 921 (or other parts, such as the connector cable 910), the gasket 921 (or the other part(s)) can slightly longitudinally expand, and the flange 924 of the connector cable 910 can be pushed away from contact with the end face of the housing 904. Even after this movement, the biasing mechanism 926 can maintain even pressure across the connector interface 923/925 due to the biasing forces applied to the cable 910 via the washer 936. When the gasket 921 (or the other part(s)) contracts (e.g., while cooling), the connector cable 910 can further maintain its seal at the connector interface 923/925 (e.g., against the gasket 921) by moving longitudinally as the cooling part(s) shrink back to its/their normal size(s) at normal ambient temperatures (e.g., 25 Celsius (C)). The cable connector retainer assembly 900*a* of FIG. 9A can therefore be used to maintain even pressure against at the connector interface 923/925 while using a longitudinally-installed connector cable 910 and/or when the cover assembly 902 needs to be attached to a protruding (e.g., male-threaded) portion (e.g., 927) of an x-ray system housing 904. Alternatively, cable connector retainer assembly 900*a* of FIG. 9A can be used to maintain even pressure at the connector interface 923/925 while using the longitudinally-installed connector cable 910 and/or when the cover assembly 902 needs to be attached to female-threaded portion of an x-ray system housing 904.

The cable connector retainer assembly 900*a* may also include an optional proximal stop portion 969 extending from or below the threads 920 of the outer plate 912. The proximal stop portion 969 may include a proximal surface 971 configured to come into contact with an outward, distally-facing, or exterior surface 973 of the housing 904 as the threads 920/922 are tightened. In this manner, the proximal surface 971 can limit the advancement of the outer plate 912 relative to the housing 904 by mechanical interference with the exterior housing surface 973. By limiting advancement of the outer plate 912, the outer plate 912 can be prevented from over-tightening at the threads. Additionally, limiting advancement of the outer plate 912 can prevent over-compression or overload at biasing mechanism 926 which could lead to degradation or irregularity of the seal at interface 923/925 (and/or 921). Accordingly, the proximal stop portion 969 can limit the amount of compression or deflection of the biasing mechanism 926, particularly in embodiments where the flange 924 is not in direct contact with the shaft 927.

The cable connector retainer assembly 900*a* may also optionally include a retention device to limit longitudinal movement of the outer plate 912 distally away from the housing 904. In some embodiments, the retention device may include a retaining clip or ring 967 positioned in a circumferentially-extending recess 979 of the connector cable 910. The ring 967 may have a greater diameter than the diameter of the opening 903, thereby mechanically stopping or impeding movement of the outer plate 912 by the ring 967. The ring 967 can help to ensure that the outer plate 912 and the internal components of the cable connector retainer assembly 900*a* remain at the end of the connector cable 910 and its cable while the cable 910 is disconnected from the shaft 927. The ring 967 can also define a maximum length or distance of displacement of the biasing mechanism 926, wherein when the threads 920/922 are disconnected from each other, the biasing mechanism 926 can expand only to the size where the outer plate 912 is limited from movement relative to the flange 924 by the ring 967. The ring 967 may function similarly to the way the clip 331 limits movement of the plates 312/314 to maximum distance D, as discussed in connection with FIG. 6. Limiting maximum displacement of the biasing mechanism 926 can enable the biasing mechanism 926 to be placed within the assembly 900*a* in a preloaded condition.

Figure 9B:
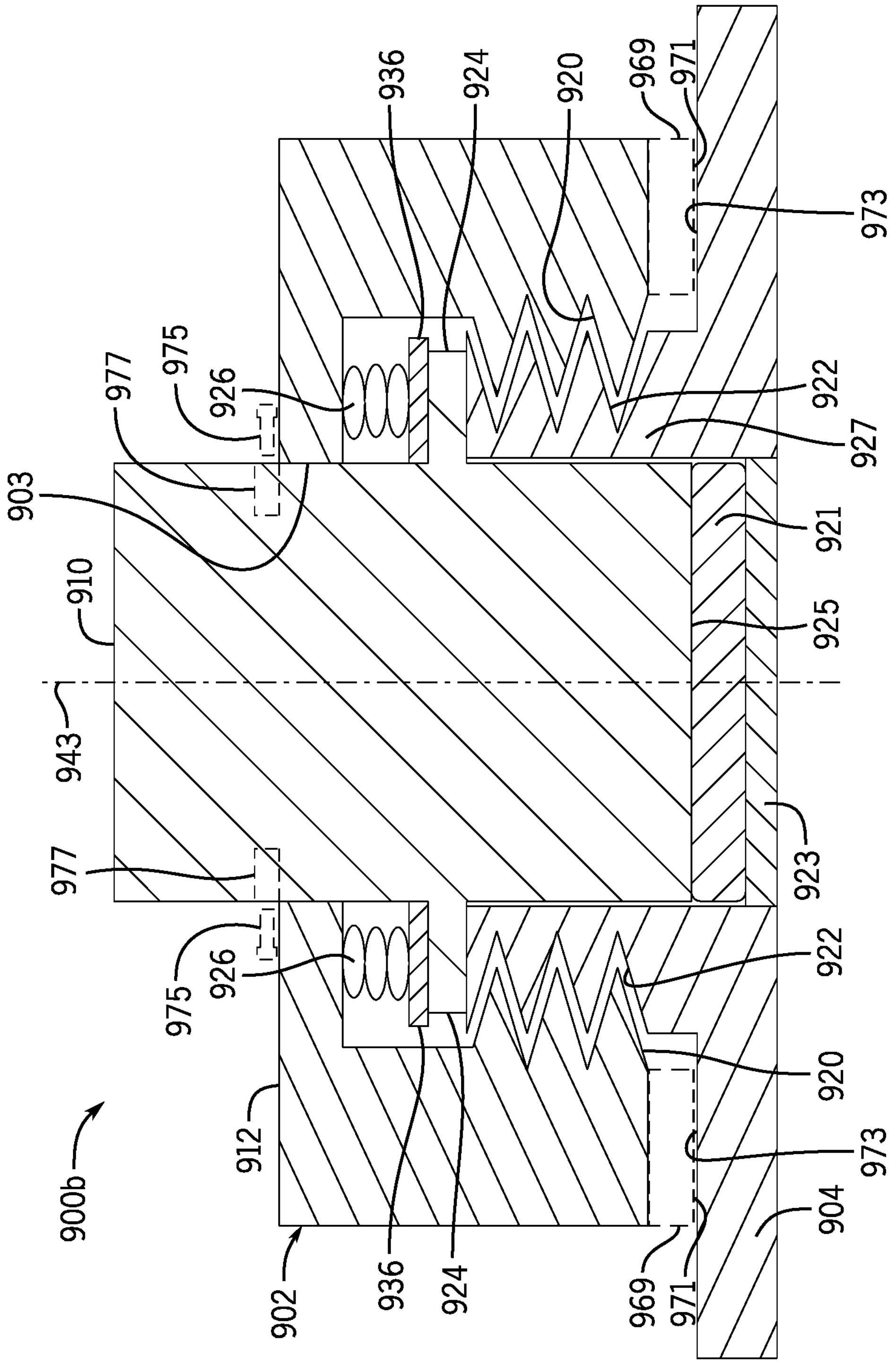
FIG. 9B illustrates another example cable connector retainer assembly for receiving a connector cable longitudinally.

FIG. 9B illustrates another example cable connector retainer assembly 900*b* for longitudinally receiving a connector cable 910. The assembly 900*b* has many features in common with assembly 900*a* and uses the same numeric indicators to identify those features. Assembly 900*b* illustrates an alternative retention system for the outer plate 912 that includes one or more notches 977, apertures, or threaded openings formed in the connector cable 910. The notches 977 may be configured to receive corresponding stops 975 (e.g., pins, pegs, fasteners, set screws, similar structures, or combinations thereof) to limit or prevent sliding of the cover assembly 902 relative to the connector cable 910 and away from the housing 904. Similar to ring 967, the stops 975 may also limit movement of the outer plate 912 relative to the flange 924 in a manner that defines a maximum distance of displacement of the biasing mechanism 926 and that enables biasing preload, as discussed above.

Accordingly, aspects of the present disclosure relate to systems, apparatuses, and methods for securing a high voltage connector. In at least one embodiment, a connector retainer cap assembly includes an outer plate, an inner plate, at least one biasing mechanism, and a retainer. The at least one biasing mechanism can be disposed between the outer plate and the inner plate and can bias the outer plate away from the inner plate. The retainer can couple the inner plate to the outer plate and can limit displacement of the inner plate away from the outer plate to a maximum distance. In this manner, the cap assembly can be simply installed, using only one retaining mechanism (e.g., only one set of threads on the cap assembly engaging one set of threads on the connector housing), while also providing evenly spread out pressure to the connector, thereby reducing the chance that imbalances will form in the pressure applied to the gasket for the tube and corresponding air gaps. Furthermore, the use of a single retaining mechanism can strengthen the retention between the connector retainer cap assembly and the connector housing compared to using a set of smaller bolts with individually smaller threads.

In some configurations, the inner plate can include a circular, flat proximal surface configured to engage a distal surface of the connector. The proximal surface can be biased evenly around its circumference by the biasing mechanism, such as by a disc spring-type biasing mechanism that circularly engages a distal surface of the inner plate and thereby evenly distributes pressure to the proximal surface of the inner plate. The inner plate can be centrally aligned with the outer plate, such as by a longitudinally-oriented pin portion (on the inner or outer plate) being received within an aperture (on the corresponding outer plate). The pin portion can be retained in the aperture by a retention mechanism, such as a clip or retaining rod, thereby limiting the displacement of the inner plate relative to the outer plate to a defined separation distance when the cap assembly is not in use. By limiting the amount of displacement of the inner and outer plates, the inner plate remains removably attached to the outer plate while the cap assembly is removed from the high voltage connector.

In some embodiments, the connector housing may include a set of side openings or vent apertures. The side openings may facilitate convective cooling of the connector and cable. A number of posts or longitudinal body structures may extend longitudinally along the head of the connector and can link a proximal end of the connector housing to a distal end thereof. The proximal end may be mountable to an imaging system or x-ray tube housing assembly (e.g., via bolts or another fastening device), and the distal end may be mountable to the cap assembly (e.g., via threads or other twist-on mounting devices) with the connector being placed in between the proximal and distal ends. At least some of the longitudinal body structures may include radially-inward-facing surfaces that are undulating or ridged, wherein only a portion of the inward-facing surfaces may be in close proximity to or contacting the outer surface of the connector. Other portions of the inward-facing surfaces may be spaced away from the outer surface of the connector in a manner that more freely permits airflow and convective cooling of the surface of the connector. Furthermore, reducing points of contact between the inward-facing surfaces and the outer surface of the connector may reduce friction between the inward-facing surface and the connector, which can reduce wear on the connector.

One aspect of the present disclosure relates to a connector retainer cap assembly or cover assembly 200 or 900*a*/900*b*, comprising: an outer plate 312 or 912; an inner plate 314 or 936; at least one biasing mechanism 316/526*a*-*b*, 626, 630*a*-*b*, and/or 926 disposed between the outer plate 312/912 and the inner plate 314/936, with the at least one biasing mechanism 316/526*a*-*b*/626/630*a*-*b*/926 biasing the outer plate 312/912 away from the inner plate 314/936; and a retainer 318, 967, or 975 coupling the inner plate 314/936 to the outer plate 312/912 and limiting displacement of the inner plate 314/936 away from the outer plate 312/912 to a maximum distance (e.g., D).

In some embodiments, the at least one biasing mechanism 316/526*a-b*/626/630*a-b*/926 may be centrally aligned with the inner plate 314/936.

In some embodiments, the connector retainer cap assembly 200 may further comprise a connector tower 204, wherein the outer plate 312 is removably attachable to a distal end 359 of the connector tower 204 with the inner plate 314 positioned within the connector tower 204. In some embodiments, the outer plate 312/912 is removably attachable to the connector tower 204/927 via threads 320/322/920/922. In some embodiments, the at least one biasing mechanism 316/526*a-b*/626/630*a-b*/926 is configured to bias the outer plate 312/912 away from the inner plate 314/936 along a central axis 343/501 of the inner plate 314/936, and the outer plate 312/912 is attachable to the connector tower 204/927 substantially parallel to the central axis. In some embodiments, the connector tower 204/927 comprises a plurality of lateral vent openings 255.

In some embodiments, the outer plate 312 comprises a flange 424 extending radially outward from a circumference of the outer plate 312, the flange having a proximally-facing stop surface 425.

In some embodiments, the retainer comprises a stem 318/910 coupled to the inner plate 314/936 and extending into an aperture 530/903 of the outer plate 312/912 and a retention device 331/967/975 to limit withdrawal of the stem 318/910 from the aperture 530/903. In some embodiments, the stem 318/910 and the aperture 530/903 centrally align the respective inner plate 314/936 and outer plate 312/912.

In some embodiments, the at least one biasing mechanism 316/526*a-b*/626/630*a-b*/926 comprises at least one disc spring 526*a-b*/630*a-b*.

In some embodiments, the at least one biasing mechanism 316/526*a-b*/626/630*a-b*/926 comprises at least two springs 526*a-b* stacked between the outer plate 312/912 and the inner plate 314/936.

In some embodiments, the at least one biasing mechanism 316/526*a-b*/626/630*a-b*/926 is preloaded while the displacement of the inner plate 314/936 away from the outer plate 312/912 is at the maximum distance.

Another aspect of the disclosure relates to a method of assembling a connector retainer cap assembly 200/900*a-b*, comprising: providing an inner plate 314/936 with a guide shaft 318/910; providing an outer plate 312/912 with a guide opening 530/903; biasing the inner plate 314/936 away from the outer plate 312/912 along an axis 343/501 aligned with the guide shaft; positioning the guide shaft 318/910 within the guide opening 530/903 to align the inner plate 314/936 relative to the outer plate 312/912; and retaining the guide shaft 318/903 relative to the guide opening 530/903 to prevent withdrawal of the inner plate 314/936 from the outer plate 312/912 beyond a predetermined distance (e.g., D).

In some embodiments biasing the inner plate 314/936 away from the outer plate 312/912 comprises positioning a spring (e.g., 316, 526*a-b*, 626, and/or 630*a-b*) between the inner plate 314/936 and the outer plate 312/912.

In some embodiments, retaining the guide shaft 318/903 relative to the guide opening 530/903 comprises attaching a retention device 331, 967, 975 to the guide shaft 318/903 external to the guide opening 530/903.

In some embodiments, the method may further comprise securing the outer plate 312/912 to a housing 204, wherein a stop surface 425 of the outer plate 312/912 engages a distal surface of the housing 204.

In some embodiments, securing the outer plate to the housing comprises threading the outer plate 312/912 to the housing via 320/322.

In some embodiments, the method may include positioning a connector 208 within the housing, contacting the inner plate 314/936 against the connector, and displacing the inner plate 314/936 toward the outer plate 312/912.

In accordance with one embodiment of the disclosure, a connector retainer cap assembly 200, 900*a*, 900*b* includes a means for coupling a cover assembly 202, 602, 902 to a housing or connector tower 204 or 927; a means for limiting advancement of the cover assembly relative to the housing separate from the means for coupling; and a means for biasing an interior plate 314 or 936 of the cover assembly toward the connector tower 204/927 and away from an exterior or outer plate 312 or 912 of the cover assembly. The means for coupling the cover assembly to the connector tower 204/927 can include engageable threads 320/322 or 920/922, twist locks, a j-lock connector (e.g., sets of pins 320*b* and channels 322*b*), a bayonet connector, a single turn connector, retention clips, latches, pins, buttons, other fasteners, similar devices, and combinations thereof. The means for limiting advancement can include a flange 424 or 924, outcropping, overhang, ledge, axially-facing surface 425, protrusion, the proximal stop portion 969, the proximal surface 971 of the proximal stop portion 969, the exterior housing surface 973, similar structures, and combinations thereof. These means for limiting advancement can be configured to cause a mechanical stop for the connector retainer cap assembly and the connector tower 204/927 when the connector retainer cap assembly is being installed (e.g., axially installed along axis 343) onto the connector tower 204/927. The means for biasing can include a biasing mechanism 316/526*a-b*/626/630*a-b*/926, one or more springs (e.g., springs 526*a*, 526*b*, 626, 630*a*, 630*b*, or 926, disc springs, Belleville springs, compression springs, extension springs, gas springs, leaf springs, torsion springs, linear springs, non-linear springs), other elastic members (e.g., elastically compressible or expandable discs), similar devices, and combinations thereof.

In one embodiment, the connector retainer cap assembly 200 further includes a means for limiting a distance between the interior plate 314 and the exterior plate 312 to a maximum distance (e.g., D). The means for limiting the distance between the plates 312, 314 may include a retainer 318 or 910 (or other rod or pin-like structure) insertable through an aperture or opening 530 or 903 or secured in place by a retention device (e.g., clip 331 or 967 or stops 975 that prevents withdrawal of the retainer (e.g., 318 or 910) from the aperture (e.g., 530 or 903) past a maximum distance (e.g., D). In some embodiments, the retainer 318/910 can be secured in place by a fastener (e.g., stop 975) or similar structure (e.g., clip 331) that enlarges the width of the retainer 318/910 on one or more sides of the aperture 530/903 to mechanically interfere with removal of the retainer 318/910 from the aperture 530/903 and to thereby limit the distance between plate 314/936 (or flange 924) and plate 312/912 to a maximum distance.

In one embodiment, the connector tower 204/927 includes a means for (convectively) cooling an interior of the connector tower. The means for convectively cooling can include grooves 239, apertures, passages, slits, vanes, similar structures, and combinations thereof formed on or in a surface of the connector tower near the surface of the connector 208. In one embodiment, the connector tower includes a means for receiving a connector cable 210 laterally. The means for receiving the connector cable 210 can include a laterally-opening cutout 203 or gap in the connector housing 204 that is sized and positioned in a manner enabling the connector cable 210 to extend through the cutout or gap and thereby laterally extend away from the connector housing 204.

In one embodiment, the cover assembly 202, 602, 902 includes a means for attaching a tool to the cover assembly to adjust advancement of the cover assembly relative to the connector tower. The means for attaching a tool can include a tool retention surface, a screw head (e.g., having a cross-, hex-, or slot-shaped recess in its top surface (e.g., surface that is distal to the x-ray tube 206)) or nut (e.g., a square, hexagonal, or octagonal set of radially-outward-facing surfaces) to which a tool (e.g., a wrench, ratchet, key, screwdriver, or the like) can be coupled in order to tighten threads of the cover assembly 202 to threads of the connector tower 204. Additionally or alternatively, the circumference (or outer perimeter) of the cover assembly 202 can include knurling or other abrasive features to facilitate hand tightening of the cover assembly 202 to the connector tower 204.

While these systems and methods have been described with reference to exemplary embodiments, it will be understood by those skilled in the art that various changes may be made and equivalents can be substituted to adapt these teachings to other problems, materials, and technologies, without departing from the scope of the claims. Features, aspects, components or acts of one embodiment may be combined with features, aspects, components, or acts of other embodiments described herein. The disclosure is thus not limited to the particular examples that are disclosed, but encompasses all embodiments falling within the appended claims.

What is claimed is:

1. A connector retainer cap assembly, comprising:
an outer plate;
an inner plate;
at least one biasing mechanism disposed between the outer plate and the inner plate, the at least one biasing mechanism biasing the outer plate away from the inner plate; and
a retainer coupling the inner plate to the outer plate and limiting displacement of the inner plate away from the outer plate to a maximum distance, the retainer fixedly coupled to the inner plate and removably coupled to the outer plate.

2. The connector retainer cap assembly of claim 1, further comprising a connector tower, wherein the outer plate is removably attachable to a distal end of the connector tower with the inner plate positioned within the connector tower.

3. The connector retainer cap assembly of claim 2, wherein the outer plate is removably attachable to the connector tower via threads.

4. The connector retainer cap assembly of claim 2, wherein the at least one biasing mechanism is configured to bias the outer plate away from the inner plate along a central axis of the inner plate, and wherein the outer plate is attachable to the connector tower substantially parallel to the central axis.

5. The connector retainer cap assembly of claim 2, wherein the connector tower comprises a plurality of lateral vent openings.

6. The connector retainer cap assembly of claim 1, wherein the outer plate comprises a flange extending radially outward from a circumference of the outer plate, the flange having a proximally-facing stop surface.

7. The connector retainer cap assembly of claim 1, wherein the retainer comprises a stem coupled to the inner plate and extending into an aperture of the outer plate and a retention device to limit withdrawal of the stem from the aperture.

8. The connector retainer cap assembly of claim 1, wherein the at least one biasing mechanism comprises at least one disc spring.

9. The connector retainer cap assembly of claim 1, wherein the at least one biasing mechanism comprises at least two springs stacked between the outer plate and the inner plate.

10. The connector retainer cap assembly of claim 1, wherein the at least one biasing mechanism is preloaded while the displacement of the inner plate away from the outer plate is at the maximum distance.

11. A method of assembling a connector retainer cap assembly, comprising:
providing an inner plate with a guide shaft;
providing an outer plate with a guide opening;
biasing the inner plate away from the outer plate along an axis aligned with the guide shaft;
positioning the guide shaft within the guide opening to align the inner plate relative to the outer plate; and
retaining the guide shaft relative to the guide opening by mechanical interference with a surface of the outer plate opposite the inner plate to prevent withdrawal of the inner plate from the outer plate beyond a predetermined distance.

12. The method of claim 11, wherein biasing the inner plate away from the outer plate comprises positioning a spring between the inner plate and the outer plate.

13. The method of claim 11, wherein retaining the guide shaft relative to the guide opening comprises attaching a retention device to the guide shaft external to the guide opening.

14. The method of claim 11, further comprising securing the outer plate to a housing, wherein a stop surface of the outer plate engages a distal surface of the housing.

15. The method of claim 14, wherein securing the outer plate to the housing comprises threading the outer plate to the housing.

16. A cable connector retainer system, comprising:
a cover assembly coupled to a housing, wherein the cover assembly includes an exterior plate and an interior plate, wherein the cover assembly is coupled to the housing by engageable threads or pins of the exterior plate;
a surface of the exterior plate for limiting advancement of the cover assembly relative to the housing separate from the engageable threads or pins of the exterior plate; and
a biasing member for biasing the interior plate of the cover assembly into the housing and away from the exterior plate of the cover assembly.

17. The cable connector retainer system of claim 16, further comprising a retainer for limiting a distance between the interior plate and the exterior plate to a maximum distance.

18. The cable connector retainer system of claim 16, wherein the housing comprises a vent opening for cooling an interior of the housing.

19. The cable connector retainer system of claim 16, wherein the housing defines an opening for receiving a connector cable laterally from the biasing direction.

20. The cable connector retainer system of claim 16, wherein the cover assembly comprises a screw head or a nut for attaching a tool to the cover assembly to adjust advancement of the cover assembly relative to the housing.

* * * * *